(12) United States Patent
Nakabayashi et al.

(10) Patent No.: US 7,211,543 B2
(45) Date of Patent: May 1, 2007

(54) PHOTOCATALYST COMPOSITION

(75) Inventors: Akira Nakabayashi, Yokohama (JP);
Kazuya Ota, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/516,348

(22) PCT Filed: Jun. 3, 2002

(86) PCT No.: PCT/JP02/05432

§ 371 (c)(1),
(2), (4) Date: Dec. 1, 2004

(87) PCT Pub. No.: WO03/101615

PCT Pub. Date: Dec. 11, 2003

(65) Prior Publication Data

US 2005/0227859 A1    Oct. 13, 2005

(51) Int. Cl.
*B01J 23/00*  (2006.01)
(52) U.S. Cl. .................. 502/530; 502/150; 502/158
(58) Field of Classification Search ............... 502/350, 502/150, 158
See application file for complete search history.

(56) References Cited

U.S. PATENT DOCUMENTS

| | | | |
|---|---|---|---|
| 5,547,823 A | 8/1996 | Murasawa et al. | |
| 5,595,813 A | 1/1997 | Ogawa et al. | |
| 6,013,372 A | 1/2000 | Hayakawa et al. | |
| 6,075,110 A * | 6/2000 | Mohri et al. ................ | 528/14 |
| 6,548,614 B2 * | 4/2003 | Mohri et al. ................ | 528/14 |
| 6,756,124 B2 * | 6/2004 | Kanamori et al. .......... | 428/447 |
| 6,787,191 B2 * | 9/2004 | Hanahata et al. ........... | 427/387 |
| 6,818,153 B2 * | 11/2004 | Burnell-Jones ......... | 252/301.36 |

FOREIGN PATENT DOCUMENTS

| | | |
|---|---|---|
| EP | 1 136 125 | 9/2001 |
| JP | 60-044053 | 3/1985 |
| JP | 60-118236 | 6/1985 |
| JP | 62-260717 | 11/1987 |
| JP | 08-103488 | 4/1996 |
| JP | 09-100437 | 4/1997 |
| JP | 09-227831 | 9/1997 |
| JP | 09-314052 | 12/1997 |
| JP | 2001-064583 | 3/2001 |
| JP | 2002-273233 | 9/2002 |
| JP | 2002-282700 | 10/2002 |
| JP | 2003-275597 | 9/2003 |

* cited by examiner

*Primary Examiner*—J. A. Lorengo
*Assistant Examiner*—Veronica Faison-Gee
(74) *Attorney, Agent, or Firm*—Staas & Halsey LLP

(57) ABSTRACT

A photocatalyst composition which comprises (A) modified photocatalyst particles, the modified photocatalyst particles (A) being prepared by subjecting particles of a photocatalyst to a modification treatment with at least one modifier compound selected from the group consisting of different compounds each of which independently comprises at least one structural unit selected from the group consisting of a triorganosilane unit, a monooxydiorganosilane unit and a dioxyorganosilane unit; and (B) a binder component comprising a phenyl group-containing silicone optionally containing an alkyl group. A film formed using the above-mentioned photocatalyst composition, a functional composite comprising a substrate and the above-mentioned film formed on the substrate, and a shaped article produced by shaping the above-mentioned photocatalyst composition.

26 Claims, 5 Drawing Sheets

Number average particle diameter = 12 nm

Number average particle diameter = 25 nm

PHOTOCATALYST COMPOSITION

BACKGROUND OF THE INVENTION

1. Field of the Invention

The present invention relates to a photocatalyst composition. More particularly, the present invention is concerned with a photocatalyst composition which comprises (A) modified photocatalyst particles, the modified photocatalyst particles (A) being prepared by subjecting particles of a photocatalyst to a modification treatment with at least one modifier compound selected from the group consisting of different compounds each of which independently comprises at least one structural unit selected from the group consisting of a triorganosilane unit, a monooxydiorganosilane unit and a dioxyorganosilane unit; and (B) a binder component comprising a phenyl group-containing silicone, optionally containing an alkyl group. Photocatalysts, such as titanium oxide, are known to cause various substances to undergo decomposition by light energy and also known to increase the hydrophilicity of a surface by light energy. Therefore, the photocatalysts have been applied to the field of environmental clean-up, fields in which it is necessary to prevent dirt from adhering to the surfaces of various substrates, and fields in which it is necessary to prevent fogging from occurring on the surfaces of various substrates. When a film containing a modified photocatalyst is formed on the surface of a substrate by using the photocatalyst composition of the present invention, not only can the modified photocatalyst be strongly immobilized on the surface of the substrate without suffering a lowering of the activity of the modified photocatalyst, but also any of the film formed and the substrate covered with the film is not deteriorated by the action of the modified photocatalyst. Further, the above-mentioned film exhibits excellent properties with respect to durability, staining resistance, hardness and the like. Therefore, the above-mentioned photocatalyst composition is extremely useful for, e.g., preventing dirt from adhering to the surfaces of various substrates, and preventing fogging from occurring on the surfaces of various substrates.

The present invention is also concerned with a film formed using the above-mentioned photocatalyst composition, a functional composite comprising the film and a substrate covered with the film, and a shaped article produced by shaping the above-mentioned photocatalyst composition.

2. Prior Art

When specific types of substances are irradiated with light having energy which is larger than the energy gap (band gap) between the conduction band and the valence band of these substances, i.e., irradiated with light (excitation light) having a wavelength smaller than a wavelength corresponding to the band gap of these substances, the light energy causes an excitation (photoexcitation) of the electrons in the valence band, so that an electron and a hole are, respectively, generated in the conduction band and the valence band. By using the reducing activity of the electron generated in the conduction band and/or using the oxidizing activity of the hole generated in the valence band, various chemical reactions can be performed.

That is, when the above-mentioned substances are irradiated with excitation light, they can function as catalysts. Therefore, the above-mentioned substances are called "photocatalysts." As a most representative example of such photocatalysts, titanium oxide is known.

As examples of chemical reactions catalyzed by the photocatalysts, there can be mentioned oxidative decomposition reactions of various organic substances. Therefore, when the photocatalysts are immobilized on the surfaces of various substrates, it is possible to cause various organic substances which have adhered to the surfaces of the substrates to undergo oxidative decomposition by light irradiation.

On the other hand, it is known that, when photocatalysts are irradiated with light, the hydrophilicity of the surfaces of the photocatalysts is increased. Therefore, when photocatalysts are immobilized on the surfaces of various substrates, it is possible to increase the hydrophilicity of the surfaces of the substrates by light irradiation.

In recent years, studies have been made for realizing application of the above-mentioned properties of photocatalysts to various fields, such as the field of environmental clean-up, fields in which it is necessary to prevent dirt from adhering to the surfaces of various substrates, and fields in which it is necessary to prevent fogging from occurring on the surfaces of various substrates. For enabling such applications, the method for immobilizing photocatalysts on the surfaces of various substrates has a great importance.

With respect to the method for immobilizing a photocatalyst on the surface of a substrate, various proposals have been made. For example, Unexamined Japanese Patent Application Laid-Open Specification No. Sho 60-044053 discloses a method for immobilizing a photocatalyst on the surface of a substrate, in which a thin film of a photocatalyst is formed on the surface of a substrate by sputtering.

Of these methods which have been proposed, one which has been attracting attention as being especially advantageous is a method for immobilizing a photocatalyst on the surface of a substrate, in which a composition containing a photocatalyst is coated on the surface of a substrate to thereby form a photocatalyst-containing film thereon.

In the above-mentioned method for immobilizing a photocatalyst by coating, it is required:

① that the photocatalyst be strongly immobilized on the surface of the substrate without suffering a lowering of the activity of the photocatalyst, and ② that any of the film formed and the substrate covered with the film formed be not deteriorated by the action of the photocatalyst.

For immobilizing a photocatalyst by coating, various methods have conventionally been proposed.

For example, Unexamined Japanese Patent Application Laid-Open Specification No. Sho 60-118236 discloses a method in which a sol containing a photocatalyst precursor (for example an organotitanate) is coated on the surface of a substrate, and the resultant film is calcined to effect gelation of the photocatalyst precursor, thereby converting the photocatalyst precursor into a photocatalyst while immobilizing the formed photocatalyst on the surface of the substrate. However, this method includes a step for forming crystal microparticles of a photocatalyst on the surface of the substrate, wherein this step requires calcination at high temperatures. Therefore, this method has a disadvantage in that, when the substrate has a large surface area, it is difficult to perform the immobilization of the photocatalyst.

As a method which uses a sol containing a photocatalyst (and which, hence, does not require a step for forming crystal microparticles of a photocatalyst), Unexamined Japanese Patent Application Laid-Open Specification No. Hei 6-278241 (corresponding to U.S. Pat. No. 5,595,813) discloses a method for immobilizing a photocatalyst on the surface of a substrate, in which a water-peptized sol of titanium oxide is coated on the surface of a substrate. However, since a titanium oxide sol cannot exhibit a film-forming property under moderate conditions, this method also requires calcination at high temperatures. Further, the film obtained by this method is brittle and easily broken and comes off from the substrate, so that it is impossible to allow the photocatalyst to exhibit its effect at the surface of the substrate.

Also, methods have been proposed in which a resin coating material containing a photocatalyst is coated on the surface of a substrate. For example, each of Unexamined Japanese Patent Application Laid-Open Specification Nos. Hei 7-171408 (corresponding to U.S. Pat. No. 5,547,823) and Hei 9-100437 discloses a method in which a photocalyst is incorporated into a resin coating material containing, as a film-forming element, a resin which is unlikely to be decomposed by the action of a photocatalyst, such as a fluoro resin or a silicone resin, and the resultant photocatalyst-containing coating material is coated on the surface of a substrate. However, in the resin coating materials used in these methods, the dispersion of the photocatalyst is poor and, therefore, the coating materials become white turbid. Further, for obtaining a good film by these methods, it is necessary for the coating materials to contain a large amount of a resin, and the use of a large amount of a resin poses a problem in that the photocatalyst is embedded in the film and, hence, cannot exhibit a satisfactory activity.

Further, Unexamined Japanese Patent Application Laid-Open Specification No. Hei 9-314052 discloses a method which uses a combination of a resin coating material and photocatalyst particles having an increased wettability for the solvent contained in the resin coating material. In this method, the resin coating material is first coated on the surface of a substrate and, then, before the curing of the coating material is completed, the above-mentioned photocatalyst particles are applied onto the coating material. However, this method is disadvantageous in that not only is needed a cumbersome operation, but also a homogeneous and transparent film cannot be obtained. The above-mentioned patent document also discloses a method intended to simplify the operation, specifically a method in which a mixture of a resin coating material and photocatalyst particles having an increased wettability for the solvent contained in the resin coating material is coated on the surface of a substrate. However, the photocatalyst cannot be prevented from being embedded in the film simply by using photocatalyst particles having an increased wettability for the solvent, and most of the photocatalyst particles are completely embedded in the film and, hence, cannot exhibit a satisfactory activity.

Further, when an organic substrate, such as a plastic shaped article, a film or an organic coating, is used as a substrate for immobilizing a photocatalyst by the above-mentioned prior art methods, the obtained photocatalyst-containing film is accompanied by the following disadvantage. The photocatalyst-containing film formed on the organic substrate causes the oxidative decomposition of the organic substrate by the action of the photocatalyt and causes the interface between the organic substrate and the photocatalyst-containing film to be deteriorated; therefore, the photocatalyst-containing film is incapable of exhibiting high durability, i.e., cannot be maintained for a long time.

For overcoming the above-mentioned disadvantages of the prior art, the present inventors previously proposed a photocatalyst composition which comprises a modified photocatalyst obtained by modifying the surfaces of photocatalyst particles with a silicone having a small surface energy and also comprises a binder having a surface energy larger than that of the modified photocatalyst (see International Patent Application Publication No. WO 2000/30747 (corresponding to EP No. 1136125 A1)). When the photocatalyst composition is used to form a film on an organic substrate, the modified photocatalyst particles in the obtained film exhibit an anisotropic distribution in the thickness-wise direction of the film, namely the concentration of the modified photocatalyst particles is low around the interface between the film and the organic substrate and is high around the exposed surface of the film. Therefore, this photocatalyst composition forms a photocatalyst-containing film which exhibits high photocatalytic activity and which is free from the occurrence of the photocatalytic deterioration at the interface between the organic substrate and the photocatalyst-containing film. However, this photocatalyst composition has the following technical problem. Even when a silicone acrylic resin which is relatively insusceptible to photocatalytic decomposition is used as a binder having large surface energy, it is impossible to completely prevent the deterioration of the binder from occurring when the binder is exposed to the action of the photocatalyst particles for a long time. As a result, it is difficult to obtain an immobilized photocatalyst-carrying substrate having high durability, i.e., having the capability of being maintained for a long time.

Unexamined Japanese Patent Application Laid-Open Specification No. Hei 9-227831 discloses a photocatalyst coating composition which comprises a surface-treated photocatalyst and a siloxane as a film-forming element (i.e., a binder), wherein the surface-treated photocatalyst is obtained by coating photocatalyst particles with a hydrolysable group-containing silane derivative or a hydrolysable group-containing siloxane oligomer, to displace the isoelectric point of the surfaces of the photocatalyst particles towards the acidic range (thereby increasing the surface energy), to thereby impart excellent dispersion stability to the photocatalyst particles and thus enable the photocatalyst particles to be preserved stably for a long time in the siloxane used as a film-forming element (i.e., a binder). However, in a film formed from the above-mentioned photocatalyst coating composition, the photocatalyst particles do not exhibit self-stratifying or self-gradating property (i.e., the ability to exhibit an anisotropic distribution) and, therefore, the photocatalyst coating composition also has the above-mentioned problem that it is difficult to obtain an immobilized photocatalyst-carrying substrate having high durability.

Further, Unexamined Japanese Patent Application Laid-Open Specification No. 2001-64583 discloses a photocatalyst-containing coating composition for forming a stratifying or gradating film, the composition comprising photocatalyst particles, a silicone acrylic resin containing no phenyl group, and an aqueous solvent as essential components thereof. The stratifying or gradating film has a structure wherein an acrylic resin component, which is a hydrophobic component of the silicone acrylic resin, exhibits an orientation such that the acryl resin component is positioned between the hydrophilic photocatalyst particles (having large surface energy) and a substrate. Therefore, the acrylic resin (which is decomposable by the photocatalyst) is an essential component of the film and, hence, the durability of the film is extremely low.

Thus, no method has yet been known which is for immobilizing a photocatalyst on the surface of a substrate by coating and which satisfies both of the above-mentioned requirements ① and ② without a need of a cumbersome operation.

An object of the present invention is to provide a technique for immobilizing a photocatalyst, the technique satisfying both of the above-mentioned requirements ① and ② without a need of a cumbersome operation. Specifically, the object of the present invention is to provide a photocatalyst composition for producing a functional composite without a need of a cumbersome operation, wherein the functional composite is free from deterioration occurring at an interface between a substrate and a photocatalyst-containing film and from deterioration of the binder component in the photocatalyst-containing film, exhibits an excellent balance of hardness and flexibility (impact resistance), and has excellent durability such that the surface of the functional composite exhibits, by light irradiation, an increased wettability (i.e., increase in hydrophilicity and hydrophobicity) and/or the photocatalyst activity for a long time. Another object of the present invention is to provide a photocatalyst composition for producing a shaped article without a need of a cumbersome operation, wherein the shaped article exhibits, by light irradiation, an increased wettability (i.e., increase in hydrophilicity and hydrophobicity) and/or the photocatalyst activity for a long time.

SUMMARY OF THE INVENTION

In this situation, the present inventors have made extensive and intensive studies with a view toward solving the above-mentioned problems. As a result, it has unexpectedly been found that this object can be attained by a photocatalyst composition which comprises (A) modified photocatalyst particles, the modified photocatalyst particles (A) being prepared by subjecting particles of a photocatalyst to a modification treatment with at least one modifier compound selected from the group consisting of different compounds each of which independently comprises at least one structural unit selected from the group consisting of a triorganosilane unit, a monooxydiorganosilane unit and a dioxyorganosilane unit; and (B) a binder component comprising a phenyl group-containing silicone, optionally containing an alkyl group. Specifically, it has been found that, when the above-mentioned photocatalyst composition is used to form a film on the surface of an organic substrate, there can be obtained, without a cumbersome operation, a functional composite which is advantageous in that it is free from deterioration occurring at the interface between the substrate and the photocatalyst-containing film and free from deterioration of the binder component in the photocatalyst-containing film, and in that it exhibits an excellent balance of hardness and flexibility (impact resistance), and it has excellent durability such that the surface of the functional composite exhibits, by light irradiation, a water contact characteristic (i.e., hydrophilicity or hydrophobicity) and/or maintains such photocatalyst activity for a long time. Based on this finding, the present invention has been completed.

Accordingly, it is a primary object of the present invention to provide a photocatalyst composition which can be used for producing, without a cumbersome operation, a functional composite which exhibits an excellent balance of hardness and flexibility (impact resistance) and which has excellent durability such that the surface of the functional composite exhibits, by light irradiation, a water contact characteristic (i.e., hydrophilicity or hydrophobicity) and/or maintains such photocatalyst activity for a long time.

It is another object of the present invention to provide a film, a shaped article, and a functional composite comprising the film and a substrate covered with the film, each of which not only can effectively prevent dirt from adhering to the surface thereof and effectively prevent fogging from occurring on the surface thereof, but also exhibits extremely excellent durability.

The foregoing and other objects, features and advantages of the present invention will be apparent from the following detailed description taken in connection with the accompanying drawings and the appended claims.

DESCRIPTION OF REFERENCE NUMERALS

Figure 5A:
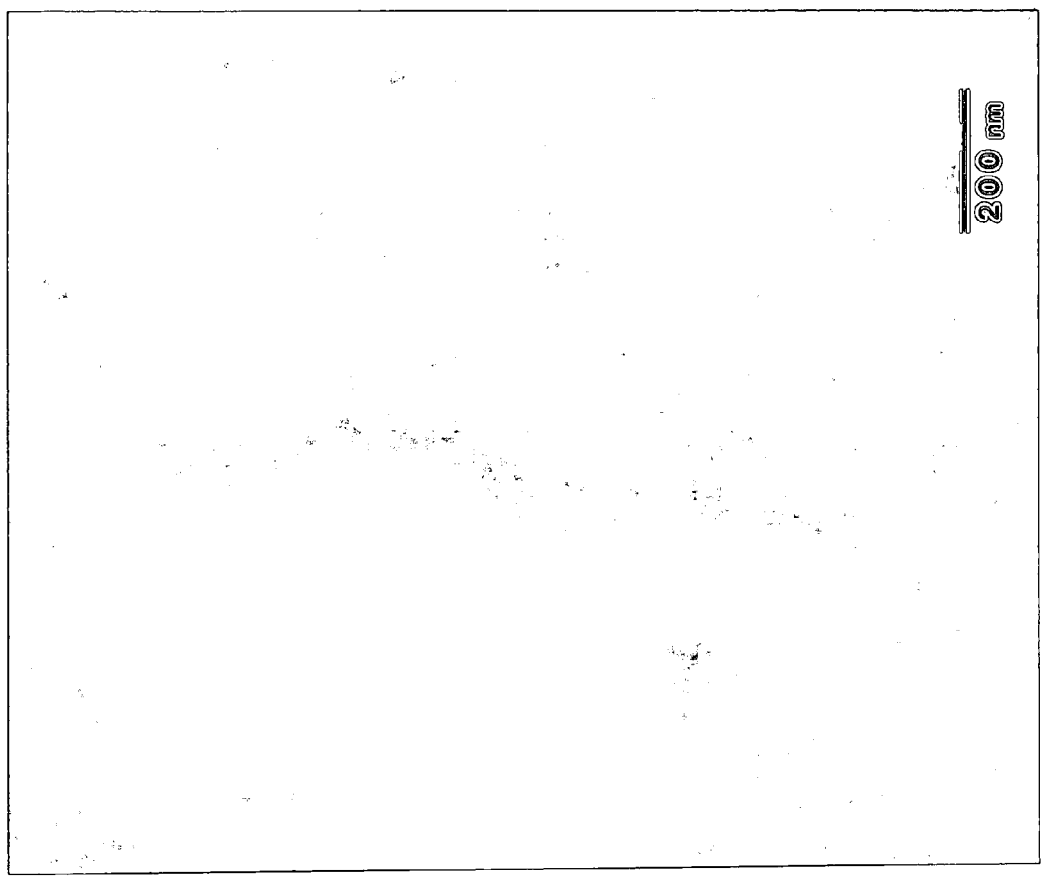
FIG. 5(a) is a photograph obtained by enlarging a portion of the TEM photograph of FIG. 4(a)
Figure 5B:
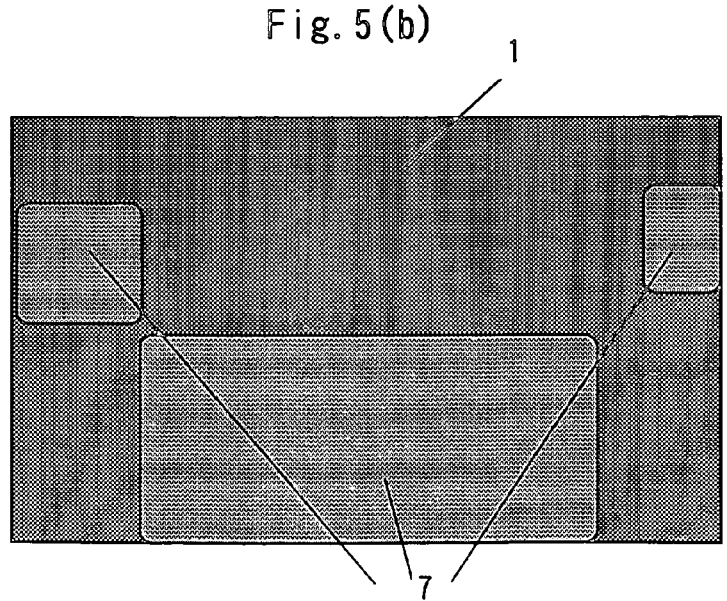
FIG. 5(b) is an illustration of FIG. 5(a)

1: modified photocatalyst particles
2: photocatalyst-containing film
3: acrylic urethane film
4: titanium oxide used as a pigment
5: epoxy resin used as a substrate
5(b): interface between modified photocatalyst particle phase 1 and binder phase 7, wherein an illustration of an enlarged photograph of the interface is shown in FIG. 5(b)
6: epoxy resin used for embedding
7: binder phase containing no modified photocatalyst particles
8: alkyl group-containing silicone

DETAILED DESCRIPTION OF THE INVENTION

According to the present invention, there is provided a photocatalyst composition comprising:

(A) modified photocatalyst particles, the modified photocatalyst particles (A) being prepared by subjecting particles of a photocatalyst (a) to a modification treatment with at least one modifier compound (b) selected from the group consisting of different compounds each of which independently comprises at least one structural unit selected from the group consisting of a triorganosilane unit represented by formula (1), a monooxydiorganosilane unit represented by formula (2), and a dioxyorganosilane unit represented by formula (3):

$$R_3Si—\quad(1)$$

wherein each R independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group, a phenyl group, a $C_1$–$C_{20}$ alkoxy group or a hydroxy group, $$—(R_2SiO)—\quad(2)$$

wherein each R is as defined for formula (1), and

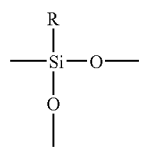

(3)

wherein R is as defined for formula (1), and (B) a binder component which comprises a phenyl group-containing silicone (BP), optionally containing an alkyl group, represented by formula (4):

$$R^1_p R^2_q X_r SiO_{(4-p-q-r)/2}\quad(4)$$

wherein:

each $R^1$ represents a phenyl group, and each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group;

each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and p, q and r satisfy the following relationships:
$0<p<4$,
$0 \leq q<4$,
$0 \leq r<4$,
$0<(p+q+r)<4$, and
$0.05 \leq p/(p+q) \leq 1$.

For easy understanding of the present invention, the essential features and various preferred embodiments of the present invention are enumerated below.

1. A photocatalyst composition comprising:

(A) modified photocatalyst particles, the modified photocatalyst particles (A) being prepared by subjecting particles of a photocatalyst (a) to a modification treatment with at least one modifier compound (b) selected from the group consisting of different compounds each of which independently comprises at least one structural unit selected from the group consisting of a triorganosilane unit represented by formula (1), a monooxydiorganosilane unit represented by formula (2), and a dioxyorganosilane unit represented by formula (3):

$$R_3Si—\quad(1)$$

wherein each R independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group, a phenyl group, a $C_1$–$C_{20}$ alkoxy group or a hydroxy group, $$—(R_2SiO)—\quad(2)$$

wherein each R is as defined for formula (1), and

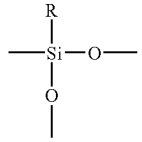

(3)

wherein R is as defined for formula (1), and (B) a binder component which comprises a phenyl group-containing silicone (BP), optionally containing an alkyl group, represented by formula (4):

$$R^1_p R^2_q X_r SiO_{(4-p-q-r)/2}\quad(4)$$

wherein:

the or each $R^1$ represents a phenyl group, and the or each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group;

the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and p, q and r satisfy the following relationships:
$0<p<4$,
$0 \leq q<4$,
$0 \leq r<4$,
$0<(p+q+r)<4$, and
$0.05 \leq p/(p+q) \leq 1$.

2. The composition according to item 1 above, wherein the or each R of each of formulae (1) to (3) independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group or a $C_1$–$C_{20}$ alkoxy group.

3. The composition according to item 1 or 2 above, wherein the phenyl group-containing silicone (BP) is a phenyl group-containing silicone (BP1), containing no alkyl group, represented by formula (5):

$$R^1_s X_t SiO_{(4-s-t)/2}\quad(5)$$

wherein:

the or each $R^1$ represents a phenyl group;

the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and s and t satisfy the following relationships:
$0<s<4$,
$0 \leq t<4$, and
$0<(s+t)<4$.

4. The composition according to item 1 or 2 above, wherein the binder component (B) further comprises an alkyl group-containing silicone (BA) represented by formula (6):

$$R^2_u X_v SiO_{(4-u-v)/2}\quad(6)$$

wherein:

the or each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group;

the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and u and v satisfy the following relationships:
$0<u<4$,
$0 \leq v<4$, and
$0<(u+v)<4$.

5. The composition according to item 1, 2 or 4 above, wherein the binder component (B) comprises a phenyl group-containing silicone (BP1), containing no alkyl group, represented by formula (5):

$$R^1{}_s X_t SiO_{(4-s-t)/2} \quad (5)$$

wherein:
the or each $R^1$ represents a phenyl group;
the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and
s and t satisfy the following relationships:
$0<s<4$,
$0 \leq t<4$, and
$0<(s+t)<4$; and an alkyl group-containing silicone (BA) represented by formula (6):

$$R^2{}_u X_v SiO_{(4-u-v)/2} \quad (6)$$

wherein:
the or each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group;
the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and
u and v satisfy the following relationships:
$0<u<4$,
$0 \leq v<4$, and
$0<(u+v)<4$.

6. The composition according to item 4 or 5 above, wherein the alkyl group-containing silicone (BA) comprises a monooxydiorganosilane unit (D) represented by formula (7) and a dioxyorganosilane unit (T) represented by formula (8):

$$—(R^2{}_2 SiO)— \quad (7)$$

wherein each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group, and

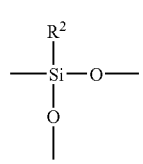

(8)

wherein $R^2$ is as defined for formula (7).

7. The composition according to item 3 or 5 above, wherein the phenyl group-containing silicone (BP1) has a weight average molecular weight of from 500 to 10,000, as measured by gel permeation chromatography using a calibration curve obtained with respect to standard polystyrenes.

8. The composition according to item 4 or 5 above, wherein the alkyl group-containing silicone (BA) has a weight average molecular weight of from 500 to 10,000, as measured by gel permeation chromatography using a calibration curve obtained with respect to standard polystyrenes.

9. The composition according to any one of items 1 to 8 above, wherein the modified photocatalyst particles (A) have a number average particle diameter of 400 nm or less.

10. The composition according to any one of items 1 to 9 above, wherein the photocatalyst particles (a) are titanium oxide particles.

11. The composition according to any one of items 1 to 10 above, wherein the modifier compound (b) is an Si—H group-containing silicon compound (b1) represented by formula (9):

$$H_x R_y SiO_{(4-x-y)/2} \quad (9)$$

wherein:
the or each R independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group, a phenyl group, a $C_1$–$C_{20}$ alkoxy group or a hydroxy group, and
x and y satisfy the following relationships:
$0<x<4$,
$0<y<4$, and
$(x+y) \leq 4$.

12. The composition according to item 11 above, wherein the Si—H group-containing silicon compound (b1) comprises at least one compound selected from the group consisting of:

a mono Si—H group-containing silicon compound represented by formula (10):

(10)

wherein each $R^3$ independently represents a straight chain or branched $C_1$–$C_{30}$ alkyl group, a straight chain or branched $C_2$–$C_{30}$ alkenyl group, a $C_5$–$C_{20}$ cycloalkyl group, a straight chain or branched $C_1$–$C_{30}$ fluoroalkyl group, a phenyl group or a siloxy group represented by formula (13):

$$—O—(R^4{}_2 SiO)_m—SiR^4{}_3 \quad (13)$$

wherein each $R^4$ independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group or a phenyl group; and m is an integer which satisfies the formula: $0 \leq m \leq 1000$, a silicon compound, having Si—H groups at both terminals thereof, represented by formula (11):

$$H—(R^3{}_2 SiO)_n—SiR^3{}_2—H \quad (11)$$

wherein $R^3$ is as defined for formula (10); and n is an integer which satisfies the formula: $0 \leq n \leq 1000$, and an H silicone represented by formula (12):

$$(R^3 HSiO)_a (R^3{}_2 SiO)_b (R^3{}_3 SiO_{1/2})_c \quad (12)$$

wherein:

R³ is as defined for formula (10); and a is an integer of 1 or more, b is an integer of 0 or more, and a and b satisfy the following relationship: (a+b) ≦10000, and c is 0 or 2, and wherein when (a+b) is an integer of 2 or more and c=0, the H silicone of formula (12) is a cyclic silicone, and when c=2, the H silicone of formula (12) is a straight chain silicone.

13. The composition according to any one of items 1 to 12 above, which further comprises a resin.

14. The composition according to any one of items 1 to 13 above, which is a film.

15. The composition according to item 14 above, which is anisotropic with respect to the distribution of the modified photocatalyst particles (A), wherein the concentration of the modified photocatalyst particles (A) increases from one surface of the film toward the other surface of the film.

16. The composition according to any one of items 1 to 13 above, which is a shaped article.

17. The composition according to item 16 above, which is anisotropic with respect to the distribution of the modified photocatalyst particles (A), wherein the concentration of the modified photocatalyst particles (A) increases from the inner portion of the shaped article toward the surface of the shaped article.

18. The composition according to item 4 above, which is a film which has a microphase separation structure with respect to the phenyl group-containing silicone (BP) and the alkyl group-containing silicone (BA).

19. The composition according to item 18 above, which is anisotropic with respect to the distribution of the modified photocatalyst particles (A), wherein the concentration of the modified photocatalyst particles (A) increases from one surface of the film toward the other surface of the film.

20. The composition according to item 4 above, which is a shaped article which has a microphase separation structure with respect to the phenyl group-containing silicone (BP) and the alkyl group-containing silicone (BA).

21. The composition according to item 20 above, which is anisotropic with respect to the distribution of the modified photocatalyst particles (A), wherein the concentration of the modified photocatalyst particles (A) increases from the inner portion of the shaped article toward the surface of the shaped article.

22. A functional composite comprising a substrate and a film formed on the substrate, the film comprising the composition of any one of items 1 to 13 above.

23. The functional composite according to item 22 above, wherein the film is anisotropic with respect to the distribution of the modified photocatalyst particles (A), wherein the concentration of the modified photocatalyst particles (A) increases from a surface of the film which contacts the substrate toward the other, exposed surface of the film.

24. A functional composite comprising a substrate and a film formed on the substrate, the film comprising the composition of item 4 above and having a microphase separation structure with respect to the phenyl group-containing silicone (BP) and the alkyl group-containing silicone (BA).

25. The functional composite according to item 24 above, wherein the film is anisotropic with respect to the distribution of the modified photocatalyst particles (A), wherein the concentration of the modified photocatalyst particles (A) increases from a surface of the film which contacts the substrate toward the other, exposed surface of the film.

Hereinbelow, the present invention is described in detail.

The modified photocatalyst particles (A) used in the present invention are prepared by subjecting particles of a photocatalyst (a) to a modification treatment with at least one modifier compound mentioned below.

In the present invention, the term "modification (of particles of a photocatalyst)" means "immobilization of the below-mentioned at least one modifier compound (b) on the surface of particles of a photocatalyst (a)". It is considered that the above-mentioned immobilization of the modifier compound (b) on the surface of particles of a photocatalyst (a) is achieved by van der Waals force (physical adsorption), Coulomb force or chemical bonding. Especially when the modification is achieved by chemical bonding, the interaction between the modifier compound and the photocatalyst advantageously becomes strong, so that the modifier compound can be strongly immobilized on the surface of the photocatalyst particles. Therefore, it is preferred that the modification is achieved by chemical bonding.

Examples of photocatalysts used as photocatalyst (a) in the present invention include $TiO_2$, $ZnO$, $SrTiO_3$, $CdS$, $GaP$, $InP$, $GaAs$, $BaTiO_3$, $BaTiO_4$, $BaTi_4O_9$, $K_2NbO_3$, $Nb_2O_5$, $Fe_2O_3$, $Ta_2O_5$, $K_3Ta_3Si_2O_3$, $WO_3$, $SnO_2$, $Bi_2O_3$, $BiVO_4$, $NiO$, $Cu_2O$, $SiC$, $MOS_2$, $InPb$, $RuO_2$, $CeO_2$ and $Ta_3N_5$. Further examples of photocatalysts include lamellar oxides containing at least one element selected from the group consisting of Ti, Nb, Ta and V (see, for example, Unexamined Japanese Patent Application Laid-Open Specification Nos. Sho 62-74452, Hei 2-172535, Hei 7-24329, Hei 8-89799, Hei 8-89800, Hei 8-89804, Hei 8-198061, Hei 9-248465, Hei 10-99694 and Hei 10-244165); nitrogen-doped titanium oxide (see, for example, Unexamined Japanese Patent Application Laid-Open Specification Nos. 2001-278625 (corresponding to US 2002-0012628 A1 and EP 1138634 A1), 2001-278627, 2001-335321 (corresponding to US 2001-0056037 A1 and EP 1160202 A1), 2002-029750 and 2001-207082); and visible-light active titanium oxide photocatalysts, such as an oxygen-deficient titanium oxide (see, for example, Unexamined Japanese Patent Application Laid-Open Specification No. 2001-212457 (corresponding to EP 1125636)). In addition, oxynitride compounds, such as $TaON$, $LaTiO_2N$, $CaNbO_2N$, $LaTaON_2$ and $CaTaO_2N$; and oxysulfide compounds, such as $Sm_2Ti_2S_2O_7$, can be advantageously used as photocatalyst (a) because these compounds exhibit high photocatalytic activity by visible light irradiation.

Still further examples of photocatalysts include photocatalysts obtained by a method in which at least one member selected from the group consisting of metals of Pt, Rh, Ru, Nb, Cu, Sn, Ni and Fe and oxides thereof is added to or immobilized on the above-exemplified photocatalysts; and photocatalysts obtained by coating the above-exemplified photocatalysts with porous calcium phosphate or the like (see Unexamined Japanese Patent Application Laid-Open Specification No. Hei 10-244166 (corresponding to U.S. Pat. No. 6,180,648 B1)).

Of these catalysts, $TiO_2$ (titanium oxide) is preferred because it has no toxicity and has excellent chemical stability. There are known 3 types of titanium oxide crystals, i.e., anatase-type, rutile-type and brookite-type. In the present invention, any of these 3 types of titanium oxide crystals can be used.

It is preferred that the crystal particle diameter (primary particle diameter) of the photocatalyst is from 1 to 400 nm, more advantageously from 1 to 50 nm.

In the present invention, the form in which the photocatalyst to be subjected to the modification treatment is provided is a factor important for the modified photocatalyst (A) to exhibit good dispersion stability, good film-forming properties and various functions. From the viewpoint of effectively utilizing the surface properties of the modified photocatalyst, it is preferred to use a photocatalyst in which a mixture of primary particles and secondary particles has a number average particle diameter of 400 nm or less. In the present invention, from the viewpoint of producing a transparent film from the photocatalyst composition comprising a modified photocatalyst (A) and a binder component (B) (described below), it is especially preferred that the photocatalyst particles prior to the modification treatment have a number average particle diameter of 100 nm or less. It is more preferred that the photocatalyst particles prior to the modification treatment have a number average particle diameter of 3 to 80 nm, more advantageously 3 to 50 nm.

In the present invention, for the below-mentioned reason, it is preferred that the photocatalyst to be subjected to the modification treatment is not in the form of a powder but in the form of a sol. In general, in the case of a photocatalyst powder comprised of microparticles, single crystal particles (primary particles) are strongly aggregated to form secondary particles, thus causing a great loss of the surface properties of the primary particles. It is very difficult to disaggregate the secondary particles back into primary particles. By contrast, in the case of a photocatalyst sol, photocatalyst particles are not dissolved but present in a form close to the primary particle form, so that the surface properties of the primary particles can be effectively utilized. Therefore, a modified photocatalyst sol obtained from a photocatalyst sol exhibits not only good dispersion stability and good film-forming properties but also various functions. The photocatalyst sol used in the present invention is a dispersion of photocatalyst particles in water and/or an organic solvent, wherein the photocatalyst particles are present in the form of primary particles and/or secondary particles in the dispersion medium, and the solids content of the dispersion is 0.01 to 70% by weight, preferably 0.1 to 50% by weight.

In the present invention, the "solids content" in terms of % by weight is the percentage of the weight of nonvolatile component(s) remaining after heating the dispersion or suspension in air at about 120° C. for 2 hours or more to thereby dry the dispersion or suspension, based on the weight of the dispersion or suspension before heating.

Examples of organic solvents usable for preparing a photocatalyst sol include alcohols, such as ethylene glycol, butyl cellosolve, n-propanol, isopropanol, n-butanol, ethanol and methanol; aromatic hydrocarbons, such as toluene and xylene; aliphatic hydrocarbons, such as hexane, cyclohexane and heptane; esters, such as ethyl acetate and n-butyl acetate; ketones, such as acetone, methyl ethyl ketone and methyl isobutyl ketone; ethers, such as tetrahydrofuran and dioxane; amides, such as dimethylacetamide and dimethylformamide; halogen compounds, such as chloroform, methylene chloride and carbon tetrachloride; dimethylsulfoxide; and nitrobenzene. These organic solvents may be used individually or in combination.

An explanation is made below by taking a titanium oxide sol as an example of a photocatalyst sol. As an example of a titanium oxide sol, there can be mentioned a titanium oxide hydrosol, in which titanium oxide particles are peptized in a dispersion medium consisting essentially of water (herein the term "dispersion medium consisting essentially of water" means a dispersion medium containing about 80% or more of water). The preparation of such a hydrosol is known, and such a hydrosol can be easily produced (see, for example, Unexamined Japanese Patent Application Laid-Open Specification Nos. Sho 63-17221, Hei 7-819 (corresponding to EP 581216 B1), Hei 9-165218 (corresponding to U.S. Pat. No. 5,840,111) and Hei 11-43327 (corresponding to U.S. Pat. No. 6,340,711 B1 and EP 826633 B1)). For example, an aqueous solution of titanium sulfate or titanium tetrachloride is subjected to hydrolysis under heating to thereby form metatitanic acid. The obtained metatitanic acid is neutralized with aqueous ammonia to thereby deposit titanium oxide hydrate, and the obtained titanium oxide hydrate is subjected to filtration, washing and dehydration to thereby obtain an aggregate of titanium oxide particles. The obtained aggregate is peptized by the action of nitric acid, hydrochloric acid or ammonia and, then, subjected to a hydrothermal treatment or the like to thereby obtain a titanium oxide hydrosol. Further examples of titanium oxide hydrosols include those hydrosols obtained by a method in which titanium oxide particles are peptized in water by the action of an acid or an alkali, and those hydrosols obtained by a method in which titanium oxide particles are dispersed in water under a strong shearing force and in which any of an acid and an alkali is not used and, if desired, a dispersant, such as sodium polyacrylate, is used. Also, by the method proposed in Unexamined Japanese Patent Application Laid-Open Specification No. 10-67516, there can be easily obtained a sol of anatase-type titanium oxide in which the particles have their surface modified with a peroxo group and exhibit excellent dispersion stability even in an aqueous solution having a pH around neutrality.

The above-described titanium oxide hydrosols are commercially available as titania sols. (Examples of commercially available titania sols include "STS-02", manufactured and sold by Ishihara Sangyo Kaisha, Ltd., Japan, and "TO-240", manufactured and sold by TANAKA TENSHA CO., LTD., Japan.)

Each of the above-described titanium oxide hydrosols has a solids content of 50% by weight or less, preferably 30% by weight or less, more preferably 0.1 to 30% by weight. Such a hydrosol has a relatively low viscosity (as measured at 20° C.). In the present invention, the hydrosol may have a viscosity in the range of from 0.5 to 2000 g·cm$^{-1}$·sec$^{-1}$. It is preferred that the hydrosol has a viscosity in the range of from 1 to 1,000 g·cm$^{-1}$·sec$^{-1}$, more advantageously from 1 to 500 g·cm$^{-1}$·sec$^{-1}$.

In addition to the methods for producing titanium oxide sols, also known are methods for producing various other types of photocatalyst sols, for example, a cerium oxide sol (see Unexamined Japanese Patent Application Laid-Open Specification No. Hei 8-59235) and a sol of a lamellar oxide containing at least one element selected from the group consisting of Ti, Nb, Ta and V (see, for example, Unexamined Japanese Patent Application Laid-Open Specification Nos. Hei 9-25123, Hei 9-67124 (corresponding to U.S. Pat. No. 5,863,514), Hei 9-227122, Hei 9-227123 and Hei 10-259023).

Further, a photocatalyst organosol, in which photocatalyst particles are dispersed in a dispersion medium consisting essentially of an organic solvent, may be used in the present invention. Examples of methods for producing a photocatalyst organosol include a method in which a photocatalyst hydrosol as mentioned above is subjected to a treatment with a compound having the phase transfer activity (i.e., a compound which, when added to a mixture comprised of two different phases (1st phase and 2nd phase), forms a 3rd phase at the interface between the 1st and 2nd phases and causes the 1st phase, the 2nd phase and the 3rd phase to dissolve and/or solubilize each other) and, then, the resultant is diluted with an organic solvent (see Unexamined Japanese Patent Application Laid-Open Specification No. Hei 10-167727); a method in which a mixture of a photocatalyst hydrosol and an anionic surfactant (such as sodium dodecylbenzenesulfonate) is mixed with a water-insoluble organic solvent, thereby causing the photocatalyst particles to be transferred to and dispersed in the water-insoluble organic solvent, thereby obtaining a photocatalyst organosol (see Unexamined Japanese Patent Application Laid-Open Specification No. Sho 58-29863); and a method in which an alcohol (such as butyl cellosolve) which has a boiling point higher than that of water is added to a photocatalyst hydrosol and, then, water is removed from the resultant mixture by distillation, reduced pressure distillation or the like. Also, there are commercially available titanium oxide organosols in which titanium oxide particles are dispersed in a dispersion medium consisting essentially of an organic solvent (e.g., "TKS-251", manufactured and sold by Tayca Corporation, Japan). Herein, the term "dispersion medium consisting essentially of an organic solvent" means a dispersion medium containing about 80% or more of an organic solvent.

In the present invention, the at least one modifier compound (b) is selected from the group consisting of different compounds each of which independently comprises at least one structural unit selected from the group consisting of a triorganosilane unit represented by formula (1), a monooxydiorganosilane unit represented by formula (2), and a dioxyorganosilane unit represented by formula (3):

$$R_3Si— \qquad (1)$$

wherein each R independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group, a phenyl group, a $C_1$–$C_{20}$ alkoxy group or a hydroxy group, $$—(R_2SiO)— \qquad (2)$$

wherein each R is as defined for formula (1), and

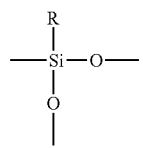
$$(3)$$

wherein R is as defined for formula (1).

The modified photocatalyst particles (A) which are prepared by subjecting photocatalyst particles (a) to a modification treatment with modifier compound (b) having the above-mentioned structural unit(s), have a very small surface energy.

In the present invention, the modification treatment of photocatalyst (a) with modifier compound (b) may be performed, in the presence or absence of water and/or an organic solvent, by mixing together the photocatalyst (a) and the modifier compound (b) so that the weight ratio of photocatalyst (a) to modifier compound (b) (i.e., (a)/(b) weight ratio) is in the range of from 1/99 to 99.9/0.1, preferably from 10/90 to 99/1, and subjecting the resultant mixture to heating at a temperature of from 0 to 200° C., preferably from 10 to 80° C., to thereby change the composition of the solvent contained in the mixture. Alternatively, instead of heating the mixture of photocatalyst (a) and modifier compound (b), the mixture may be subjected to distillation, reduced pressure distillation or the like.

Examples of organic solvents usable for the modification treatment include aromatic hydrocarbons, such as toluene and xylene; aliphatic hydrocarbons, such as hexane, cyclohexane and heptane; esters, such as ethyl acetate and n-butyl acetate; alcohols, such as ethylene glycol, butyl cellosolve, isopropanol, n-butanol, ethanol and methanol; ketones, such as acetone, methyl ethyl ketone and methyl isobutyl ketone; ethers, such as tetrahydrofuran and dioxane; amides, such as dimethylacetamide and dimethylformamide; halogen compounds, such as chloroform, methylene chloride and carbon tetrachloride; dimethyl sulfoxide; and nitrobenzene. These solvents can be used individually or in combination.

Examples of modifier compounds (b) used for preparing the modified photocatalyst (A) used in the present invention include a silicon compound having a functional group which is reactive to particles of a photocatalyst (a), such as an Si—H group, a hydrolysable silyl group (e.g., an alkoxysilyl group, a hydroxysilyl group, a halogenated silyl group, an acetoxysilyl group or an aminoxysilyl group), an epoxy group, an acetoacetyl group, a thiol group or an acid anhydride group; and a silicon compound having a structure (such as a polyoxyalkylene group) which interacts with particles of photocatalyst (a) by van der Waals force, Coulomb force or the like.

In the present invention, as modifier compound (b), an Si—H group-containing silicon compound (b1) represented by formula (9) below is advantageous for efficiently modifying the surface of particles of a photocatalyst.

$$H_xR_ySiO_{(4-x-y)/2} \qquad (9)$$

wherein:
the or each R independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group, a phenyl group, a $C_1$–$C_{20}$ alkoxy group or a hydroxy group, and x and y satisfy the following relationships:
0<x<4,
0<y<4, and
(x+y)≦4.

In the present invention, the modification treatment of photocatalyst (a) with the Si—H group-containing silicon compound (b1) represented by formula (9) above is performed by mixing together photocatalyst (a) and Si—H group-containing silicon compound (b1) in the presence or absence of water and/or an organic solvent and at a temperature of from 0 to 200° C. so that the weight ratio of photocatalyst (a) to modifier compound (b1) (i.e., (a)/(b1) weight ratio) is in the range of from 1/99 to 99.9/0.1, preferably from 10/90 to 99/1, thereby obtaining a mixture. Hydrogen gas is generated from the mixture and, when a photocatalyst sol is used as photocatalyst (a), an increase in the number average particle diameter of the photocatalyst particles is observed during the modification treatment. Further, when titanium oxide is used as photocatalyst (a), a decrease in the amount of the Ti—OH group is caused by the modification treatment, and this decrease is detected as a decrease in the absorbance at 3630 to 3640 cm$^{-1}$ in an IR spectrum.

As seen from the above, it is presumed that, when Si—H group-containing silicon compound (b1) represented by formula (9) is used as modifier compound (b), the modified photocatalyst (A) (obtained from Si—H group-containing silicon compound (b1) and photocatalyst (a)) is not a simple mixture of components (b1) and (a), but is rather a product obtained as a result of interactions involving a chemical reaction between the Si—H group-containing silicon compound (b1) and the photocatalyst (a). Therefore, it is very preferred to use Si—H group-containing silicon compound (b1) represented by formula (9) as modifier compound (b). In fact, the modified photocatalyst (A) obtained from Si—H group-containing silicon compound (b1) and photocatalyst (a) exhibits excellent properties with respect not only to dispersion stability and chemical stability in an organic solvent, but also to durability.

In the present invention, the modification treatment of photocatalyst (a) with Si—H group-containing silicon compound (b1) represented by formula (9) above may be performed by using a dehydrogenation-condensation catalyst (which catalyzes a dehydrogenation-condensation reaction of an Si—H group) and at a temperature of from 0 to 150° C.

In the case of the use of the above-mentioned dehydrogenation-condensation catalyst for an Si—H group, the modification treatment of the particles of a photocatalyst (a) with an Si—H group-containing silicon compound (b1) may be conducted either by a method in which the dehydrogenation-condensation catalyst is previously immobilized on the surface of the photocatalyst particles by using, for example, a photoreduction method, or by a method in which the modification treatment is conducted in the presence of the dehydrogenation-condensation catalyst.

The term "dehydrogenation-condensation catalyst for an Si—H group" means a compound which accelerates the dehydrogenation-condensation reaction of an Si—H group with an active hydrogen-containing group present on the surface of the particles of the photocatalyst or with water or the like, wherein examples of active hydrogen-containing groups include a hydroxyl group (a Ti—OH group when the photocatalyst is titanium oxide), a thiol group, an amino group and a carboxyl group. By the use of the dehydrogenation-condensation catalyst, it becomes possible to modify the surface of the particles of the photocatalyst under moderate conditions. The dehydrogenation-condensation catalyst is used in an amount of 0.1 to 2.0 parts by weight, preferably 1 to 5 parts by weight, relative to 100 parts by weight of the photocatalyst.

Examples of dehydrogenation-condensation catalysts include metals belonging to the platinum group (i.e., ruthenium, rhodium, palladium, osmium, iridium and platinum) and compounds thereof, and metals and compounds of silver, iron, copper, cobalt, nickel, tin and the like. Of these, preferred are metals of the platinum group and compounds thereof, especially metallic platinum and platinum compounds.

Examples of such platinum compounds include platinum (II) chloride, hydrogen tetrachloroplatinate(II), platinum (IV) chloride, hydrogen hexachloroplatinate(IV), ammonium hexachloroplatinate(IV), potassium hexachloroplatinate(IV), platinum(II) hydroxide, platinum (IV) dioxide, dichloro(dicyclopenta-dienyl)platinum(II), a platinum-vinylsiloxane complex, a platinum-phosphine complex and a platinum-olefin complex.

In the Si—H group-containing silicon compound (b1) of formula (9) above which can be advantageously used as a modifier compound in the present invention, the Si—H group is a functional group which is necessary for modifying the photocatalyst with high selectivity under moderate conditions. On the other hand, a hydrolyzable group also can be utilized to modify the photocatalyst, but tends to cause side reactions, thus lowering the stability of the resultant modified photocatalyst. Therefore, it is preferred that the amount of a hydrolyzable group is as small as possible.

As an example of an Si—H group-containing silicon compound (b1) represented by formula (9) above which can be advantageously used as a modifier compound in the present invention, there can be mentioned at least one Si—H group-containing silicon compound having no hydrolysable silyl groups, which is selected from the group consisting of:

a mono Si—H group-containing silicon compound represented by formula (10):

wherein each $R^3$ independently represents a straight chain or branched $C_1$–$C_{30}$ alkyl group, a straight chain or branched $C_2$–$C_{30}$ alkenyl group, a $C_5$–$C_{20}$ cycloalkyl group, a straight chain or branched $C_1$–$C_{30}$ fluoroalkyl group, a phenyl group or a siloxy group represented by formula (13):

wherein each $R^4$ independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group or a phenyl group; and m is an integer which satisfies the formula: $0 \leq m \leq 1{,}000$, a silicon compound, having Si—H groups at both terminals thereof, represented by formula (11):

wherein $R^3$ is as defined for formula (10); and
n is an integer which satisfies the formula: $0 \leq n \leq 1{,}000$, and an H silicone represented by formula (12):

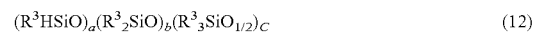

wherein:
$R^3$ is as defined for formula (10); and
a is an integer of 1 or more, b is an integer of 0 or more, and a and b satisfy the following relationship: (a+b) $\leq 10{,}000$, and c is 0 or 2, and
wherein when (a+b) is an integer of 2 or more and c=0, the H silicone of formula (12) is a cyclic silicone, and when c=2, the H silicone of formula (12) is a straight chain silicone.

Specific examples of mono Si—H group-containing silicon compounds represented by formula (10) above include bis(trimethylsiloxy)methylsilane, bis(trimethylsiloxy)ethylsilane, bis(trimethylsiloxy)n-propylsilane, bis(trimethylsiloxy)i-propylsilane, bis(trimethylsiloxy)n-butylsilane, bis (trimethylsiloxy)n-hexylsilane, bis(trimethylsiloxy) cyclohexylsilane, bis(trimethylsiloxy)phenylsilane, bis (triethylsiloxy)methylsilane, bis(triethylsiloxy)ethylsilane, tris(trimethylsiloxy)silane, tris(triethylsiloxy)silane, pentamethyldisiloxane, 1,1,1,3,3,5,5-heptamethyltrisiloxane, 1,1,1,3,3,5,5,6,6-nonamethyltetrasiloxane, trimethylsilane, ethyldimethylsilane, methyldiethylsilane, triethylsilane, phenyldimethylsilane, diphenylmethylsilane, cyclohexyldimethylsilane, t-butyldimethylsilane, di-t-butylmethylsilane, n-octadecyldimethylsilane, tri-n-propylsilane, tri-i-propylsilane, tri-i-butylsilane, tri-n-hexylsilane, triphenylsilane, allyldimethylsilane, 1-allyl-1,1,3,3-tetramethyldisiloxane, chloromethyldimethylsilane and 7-octenyldimethylsilane.

Among the above-mentioned mono Si—H group-containing silicon compounds, from the viewpoint of obtaining high reactivity of the Si—H group during the modification treatment (i.e., the dehydrogenation-condensation reaction) of a photocatalyst and from the viewpoint of obtaining small surface energy, preferred are bis(trimethylsiloxy)methylsilane, tris(trimethylsiloxy)silane, pentamethyldisiloxane and the like, which are compounds having a siloxy group but no phenyl groups and which are represented by the following formula (14):

(14)

wherein each $R^5$ independently represents a straight chain or branched $C_1$–$C_{30}$ alkyl group, a straight chain or branched $C_2$–$C_{30}$ alkenyl group, a $C_5$–$C_{20}$ cycloalkyl group, a straight chain or branched $C_1$–$C_{30}$ fluoroalkyl group or a siloxy group represented by formula (13b) below, with the proviso that at least one $R^5$ is a siloxy group represented by formula (13b):

—O—$(R^{4'}_2 SiO)_m$—$SiR^{4'}_3$ (13b)

wherein each $R^{4'}$ independently represents a straight chain or branched $C_1$–$C_{30}$ alkyl group, a $C_5$–$C_{20}$ cycloalkyl group or a straight chain or branched $C_1$–$C_{30}$ fluoroalkyl group; and m is an integer which satisfies the formula: $0 \leq m \leq 1{,}000$.

Specific examples of silicon compounds, having Si—H groups at both terminals thereof, represented by formula (11) include H-terminated polydimethylsiloxanes having a number average molecular weight of 50,000 or less, such as 1,1,3,3-tetramethyldisiloxane, 1,1,3,3,5,5-hexamethyltrisiloxane and 1,1,3,3,5,5,7,7-octamethyltetrasiloxane; H-terminated polydiethylsiloxanes having a number average molecular weight of 50,000 or less, such as 1,1,3,3-tetraethyldisiloxane, 1,1,3,3,5,5-hexaethyltrisiloxane and 1,1,3,3,5,5,7,7-octaethyltetrasiloxane; H-terminated polydiphenylsiloxanes having a number average molecular weight of 50,000 or less, such as 1,1,3,3-tetraphenyldisiloxane, 1,1,3,3,5,5-hexaphenyltrisiloxane and 1,1,3,3,5,5,7,7-octaphenyltetrasiloxane; H-terminated polyphenylmethylsiloxanes having a number average molecular weight of 50,000 or less, such as 1,3-diphenyl-1,3-dimethyl-disiloxane, 1,3,5-trimethyl-1,3,5-triphenyl-trisiloxane, 1,3,5,7-tetramethyl-1,3,5,7-tetraphenyl-tetrasiloxane; dimethylsilane; ethylmethylsilane; diethylsilane; phenylmethylsilane; diphenylsilane; cyclohexylmethylsilane; t-butylmethylsilane; di-t-butylsilane; n-octadecylmethylsilane and allylmethylsilane.

Among the above-mentioned silicon compounds having Si—H groups at both terminals thereof, from the viewpoint of obtaining high reactivity of the Si—H groups during the modification treatment (i.e., the dehydrogenation-condensation reaction) of a photocatalyst and from the viewpoint of obtaining small surface energy, preferred are H-terminated polydialkylsiloxanes (represented by formula (15) below) having a number average molecular weight of 10,000 or less, preferably 2,000 or less, more preferably 1,000 or less.

H—$(R^6_2 SiO)_d$—$SiR^6_2$—H (15)

wherein each $R^6$ independently represents a straight chain or branched $C_1$–$C_{30}$ alkyl group or a straight chain or branched $C_1$–$C_{30}$ fluoroalkyl group; and d is an integer of 0 or more.

In the present invention, from the viewpoint of obtaining high dispersion stability (i.e., prevention of the aggregation of photocatalyst particles) during the modification treatment of a photocatalyst, it is preferred that the H silicone represented by formula (12) above has a number average molecular weight of 5,000 or less, more advantageously 2,000 or less, still more advantageously 1,000 or less.

The modified photocatalyst particles (A) are prepared by subjecting particles of photocatalyst (a) to a modification treatment with modifier compound (b) comprising at least one of the above-mentioned structural units. In the present invention, for the modified photocatalyst particles (A) to have self-stratifying or self-gradating property explained below, it is necessary that the modified photocatalyst particles (A) have a surface energy which is smaller than that of the phenyl group-containing silicone (BP) of binder component (B). Phenyl group-containing silicone (BP) is an essential component of binder component (B) of the photocatalyst composition of the present invention and has a large surface energy. For obtaining modified photocatalyst particles (A) having self-stratifying or self-gradating property, it is preferred that modifier compound (b) used for obtaining a modified photocatalyst (A) has no phenyl group and no hydroxyl group, since a phenyl group and a hydroxyl group have large surface energy. Therefore, in each of the formulae (1) to (3) above representing a structural unit of modifier compound (b), it is preferred that the or each R independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group or a $C_1$–$C_{20}$ alkoxy group.

In the present invention, it is preferred that modified photocatalyst (A) is in the form of a sol having a number average particle diameter of 400 nm or less, more advantageously 1 to 100 nm, most advantageously 5 to 80 nm, wherein the number average particle diameter is measured with respect to a mixture of primary and secondary particles of the modified photocatalyst.

Especially when a modified photocatalyst sol having a number average particle diameter of 100 nm or less is used for obtaining the photocatalyst composition of the present invention, the obtained photocatalyst composition is advantageous for forming a film which is anisotropic with respect to the distribution of the modified photocatalyst particles in the thickness-wise direction of the film, wherein the concentration of the modified photocatalyst particles is low around the interface between the film and the organic substrate and is high around the exposed surface of the film. Therefore, use of a modified photocatalyst sol having a number average particle diameter of 100 nm or less is preferred for forming a photocatalyst-containing film which not only has high photocatalytic activity, but is also free from the occurrence of photocatalytic deterioration at the interface between the organic substrate and the photocatalyst-containing film. Such modified photocatalyst sol can be obtained by subjecting the photocatalyst sols exemplified above to a modification treatment with modifier compound (b).

With respect to titanium oxide and the like, it should be noted that the term "particle diameter" which is generally indicated in the art in connection with the conventional products of titanium oxide and the like is, in many cases, the diameter of primary particles (i.e., crystal particles) and, thus, the diameter of secondary particles (i.e., particles formed by aggregation of primary particles) is not reflected in such "particle diameter" value mentioned in the art.

As mentioned above, the photocatalyst composition of the present invention comprises the modified photocatalyst (A) and a binder component (B) which comprises a phenyl group-containing silicone (BP) represented by the following formula (4):

$$R^1_p R^2_q X_r SiO_{(4-p-q-r)/2} \quad (4)$$

wherein:
the or each $R^1$ represents a phenyl group, and the or each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group;
the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and
p, q and r satisfy the following relationships:
$0<p<4$,
$0 \leq q<4$,
$0 \leq r<4$,
$0<(p+q+r)<4$, and
$0.05 \leq p/(p+q) \leq 1$.

In the photocatalyst composition of the present invention, the weight ratio of modified photocatalyst (A) to binder component (B) (i.e., (A)/(B) weight ratio) (B) is in the range of from 0.1/99.9 to 99/1, preferably from 1/99 to 90/10.

As examples of phenyl group-containing silicones (BP) represented by formula (4) above, there can be mentioned silicones comprising at least one siloxane linkage structure selected from the group consisting of the structures respectively represented by the following formulae (16), (17), (18) and (19):

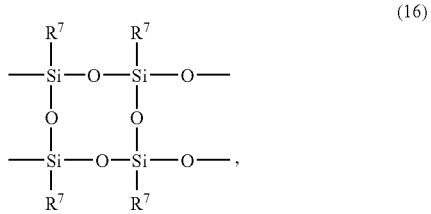
(16)

(17),

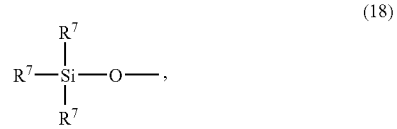
(18)

wherein each $R^7$ independently represents a phenyl group, a straight chain or branched $C_1$–$C_{30}$ alkyl group or a $C_5$–$C_{20}$ cycloalkyl group; and

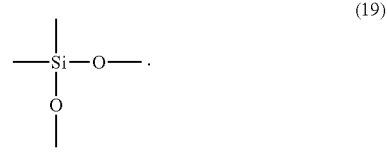
(19)

The silicones comprising at least one of the above-mentioned structures can be prepared, for example, as follows. A silane derivative selected from the group consisting of a trifunctional silane derivative represented by the following formula:

$$R^7SiX_3,$$

a bifunctional silane derivative represented by the following formula:

$$R^7_2SiX_2, \text{ and}$$

a tetrafunctional silane derivative represented by the following formula:

$$SiX_4$$

wherein in each of the above-mentioned formulae, the or each $R^7$ independently represents a phenyl group, a straight chain or branched $C_1$–$C_{30}$ alkyl group or a $C_5$–$C_{20}$ cycloalkyl group; and each X independently represents a reactive group selected from the group consisting of hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom, is subjected to partial hydrolysis-condensation, thereby obtaining a reaction mixture containing a partial condensate of a silane derivative monomer. If desired, a monofunctional silane derivative represented by the formula $R^7_3SiX$ (wherein each of $R^7$ and X is as defined for the formulae above) and/or an alcohol, as a polymerization terminator, may be added to the reaction mixture. The thus obtained partial condensate of a silane derivative monomer has a weight average molecular weight of 100 to 100,000, preferably 400 to 50,000, as measured using a calibration curve obtained with respect to standard polystyrenes.

As a method for producing a silicone usable as binder component (B) in the present invention, there can be mentioned, for example, a method described in "Zoru-geru hou no kagaku (Science of sol-gel process)" (author: Sumio Sakka, published by Agne Shofu Publishing Inc., Japan, in 1988).

Among the phenyl group-containing silicones (BP) represented by formula (4) above, preferred is a silicone which contains a ladder structure represented by formula (16) above in an amount of 10 mol % or more, preferably 40 mol % or more. The use of such silicone for producing the photocatalyst composition is advantageous in that a film prepared from the photocatalyst composition has excellent properties with respect to hardness, heat resistance, weatherability, staining resistance, chemical resistance and the like. Among the ladder structures represented by formula (16) above, a phenyl ladder structure (i.e., a ladder structure represented by formula (16) in which each $R^7$ represents a phenyl group) is especially preferred for improving the above-mentioned properties of a film produced from the photocatalyst composition. Such a ladder structure can be confirmed, for example, by the presence of two absorption peaks ascribed to siloxane linkages in an IR spectrum of a silicone, wherein the peaks are observed at around 1040 cm$^{-1}$ and 1160 cm$^{-1}$ (see J. F. Brown. Jr. et al., J. Am. Chem. Soc., Vol. 82, 6194 (1960)).

In the present invention, it is necessary that the phenyl group-containing silicone (BP) represented by formula (4) above contain a Ph—Si linkage (wherein Ph represents a phenyl group).

As explained above, in the photocatalyst composition of the present invention, modified photocatalyst (A), which is obtained by a modification treatment with modifier compound (b) comprising a structural unit having a very small surface energy (i.e., a structural unit represented by any of formulae (1) to (3)), is used in combination with binder component (B) which comprises a phenyl group-containing silicone (BP) having a surface energy larger than that of modified photocatalyst (A). By virtue of the use of such a binder component, the photocatalyst composition of the present invention exhibits a self-stratifying or self-gradating property with respect to the distribution of modified photocatalyst (A). In the present invention, the term "self-stratifying or self-gradating property" is defined as follows. When the photocatalyst composition of the present invention is formed into a film or a shaped article, during the shaping of the photocatalyst composition, the modified photocatalyst particles (A) in the photocatalyst composition are autonomously distributed to form a structure having a concentration gradient of the modified photocatalyst particles, wherein the autonomous distribution occurs in accordance with the properties (especially hydrophilicity or hydrophobicity) of a surface contacting the film or the shaped article. Such ability of the photocatalyst composition to form a concentration gradient of the modified photocatalyst particles (A) is called the "self-stratifying or self-gradating property" of the photocatalyst composition.

The above-mentioned self-stratifying or self-gradating property is imparted by the use of a phenyl group-containing silicone (BP) having a large surface energy. Specifically, the self-stratifying or self-gradating property of the photocatalyst composition can be exhibited by the use of a phenyl group-containing silicone (BP) represented by formula (4) above which contains a phenyl group (R$^1$) in an amount of at least 5 mol %, based on the total molar amount of phenyl group(s) (R$^1$) and other substituent group(s) (R$^2$) (hereinafter, this total molar amount is referred to as "R$^1$+R$^2$ value"), wherein the or each R$^2$ independently represents a straight chain or branched C$_1$–C$_{30}$ alkyl group, a C$_5$–C$_{20}$ cycloalkyl group or a straight chain or branched C$_2$–C$_{30}$ alkenyl group.

The effect of phenyl group-containing silicone (BP) to impart the self-stratifying or self-gradating property to the photocatalyst composition is increased in accordance with an increase in the molar amount of phenyl group(s) (R$^1$), relative to the R$^1$+R$^2$ value. Therefore, it is preferred that the phenyl group-containing silicone (BP) used as binder component (B) contains phenyl group(s) (R$^1$) in an amount of at least 10 mol %, more advantageously at least 20 mol %, still more advantageously at least 50 mol %, based on the R$^1$+R$^2$ value.

The phenyl group-containing silicone (BP) exhibits excellent adhesion to organic substrates (such as organic resins), and the siloxane linkage (—O—Si—) which constitutes the skeleton of the phenyl group-containing silicone (BP) is insusceptible to the oxidative decomposition by the photocatalytic activity. Therefore, a functional composite obtained by coating on a substrate the photocatalyst composition of the present invention, and a shaped article obtained from the photocatalyst composition of the present invention have excellent weathering resistance.

For the photocatalyst composition of the present invention to more effectively exhibit the self-stratifying or self-gradating property, it is more advantageous that the phenyl group-containing silicone (BP) used as binder component (B) is a phenyl group-containing silicone, containing no alkyl group, which is designated as "BP1" and represented by the following formula (5):

$$R^1{}_s X_t SiO_{(4-s-t)/2} \qquad (5)$$

wherein:
the or each R$^1$ represents a phenyl group;
the or each X independently represents a hydrogen atom, a hydroxyl group, a C$_1$–C$_{20}$ alkoxy group, a C$_1$–C$_{20}$ acyloxy group, an aminoxy group, a C$_1$–C$_{20}$ oxime group or a halogen atom; and
s and t satisfy the following relationships:
0<s<4,
0≦t<4, and
0<(s+t)<4.

It is preferred that binder component (B) further comprises an alkyl group-containing silicone (BA) represented by the below-mentioned formula (6), since, in such case, the film formed from the photocatalyst composition exhibits excellent properties with respect to film-foaming property, hardness, heat resistance, staining resistance, chemical resistance and the like.

$$R^2{}_u X_v SiO_{(4-u-v)/2} \qquad (6)$$

wherein:
the or each R$^2$ independently represents a straight chain or branched C$_1$–C$_{30}$ alkyl group, a C$_5$–C$_{20}$ cycloalkyl group or a straight chain or branched C$_2$–C$_{30}$ alkenyl group;
the or each X independently represents a hydrogen atom, a hydroxyl group, a C$_1$–C$_{20}$ alkoxy group, a C$_1$–C$_{20}$ acyloxy group, an aminoxy group, a C$_1$–C$_{20}$ oxime group or a halogen atom; and
u and v satisfy the following relationships:
0<u<4,
0≦v<4, and
0<(u+v)<4.

When binder component (B) is a mixture of the phenyl group-containing silicone (BP1) containing no alkyl group (which is represented by formula (5) above) and the alkyl group-containing silicone (BA) (which is represented by formula (6) above), it is preferred that the phenyl group-containing silicone (BP1) containing no alkyl group and the alkyl group-containing silicone (BA) are used in amounts such that the (BP1)/(BA) weight ratio is 5/95 to 95/5, preferably 30/70 to 90/10. When a film is formed from a photocatalyst composition of the present invention which contains such a binder component (B), the film has a structure in which the modified photocatalyst particles (A) are dispersed in a binder comprised of a microphase separation form of a mixture of the phenyl group-containing silicone (BP1) containing no alkyl group and the alkyl group-containing silicone (BA), and such a film exhibits excellent weathering resistance for a long period of time.

It is preferred that each of the phenyl group-containing silicone (BP1) containing no alkyl group and the alkyl group-containing silicone (BA) which are used as binder component (B) has a weight average molecular weight in the range of from 100 to 10,000, more advantageously from 500 to 6,000, still more advantageously from 700 to 4,000, as measured by GPC using a calibration curve obtained with respect to standard polystyrenes. When each of the above-mentioned silicones used as binder component (B) has a molecular weight in the above-mentioned range, the microphase separation structure of the binder component (B) becomes more remarkable.

Herein, the term "microphase separation" used with respect to the phenyl group-containing silicone (BP1) containing no alkyl group and to the alkyl group-containing silicone (BA) means that the above-mentioned silicones exhibit a phase separation state in which each silicone is present in the form of domains each having a size in the range of from 1 nm$^3$ to 1 μM, preferably from 10 nm$^3$ to 0.1 μm$^3$, more preferably from 10 nm$^3$ to 0.001 μm$^3$.

It is more preferred that the alkyl group-containing silicone (BA) (to be mixed with the phenyl group-containing silicone (BP1) containing no alkyl group) comprises a monooxydiorganosilane unit (D) represented by formula (7) and a dioxyorganosilane unit (T) represented by formula (8):

—(R$^2_2$SiO)—  (7)

wherein each R$^2$ independently represents a straight chain or branched C$_1$–C$_{30}$ alkyl group, a C$_5$–C$_{20}$ cycloalkyl group or a straight chain or branched C$_2$–C$_{30}$ alkenyl group, and

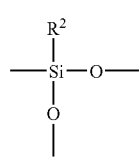

(8)

wherein R$^2$ is as defined for formula (7), wherein the monooxydiorganosilane unit (D) and the dioxyorganosilane unit (T) may be used in molar amounts such that the molar ratio of the monooxydiorganosilane unit (D) to the dioxyorganosilane unit (T) (i.e., (D)/(T) molar ratio) is in the range of from 100/0 to 5/95, preferably from 90/10 to 10/90. This more preferred form of the photocatalyst composition is advantageous in that there can be obtained an increase in the stress relaxation effect of the microphase separation state of the phenyl group-containing silicone (BP1) containing no alkyl group and the alkyl group-containing silicone (BA), thereby improving the cracking resistance of the film formed from the photocatalyst composition of the present invention. As a result, the film exhibits excellent weathering resistance.

Binder component (B) used in the photocatalyst composition of the present invention may be in any of a solution form in a solvent, a dispersion form in a solvent and a liquid or solid form without a solvent.

In the photocatalyst composition of the present invention, the phenyl group-containing silicone (BP) represented by formula (4) above may or may not have a reactive group (i.e., "X" in formula (4)); however, from the viewpoint of obtaining a film or shaped article having excellent properties with respect to hardness, heat resistance, chemical resistance, durability and the like, it is preferred that the phenyl group-containing silicone (BP) has a reactive group X (that is, it is preferred that in formula (4), r satisfies the relationship 0<r). Further, for the same reason as mentioned above, it is preferred that in formula (5), t satisfies the relationship 0<t, and that in formula (6), v satisfies the relationship 0<v.

In the photocatalyst composition of the present invention, when the reactive group (i.e., "X" in formula (4)) of the phenyl group-containing silicone (BP) is a hydroxyl group and/or a hydrolyzable group, a conventional hydrolysis catalyst or curing catalyst may added to the phenyl group-containing silicone (BP) in an amount of from 0.01 to 20% by weight, preferably from 0.1 to 5% by weight, based on the weight of the phenyl group-containing silicone (BP).

As a conventional hydrolysis catalyst, preferred are acidic compounds (such as hydrogen halides, carboxylic acids and sulfonic acids); acidic or weakly acidic inorganic salts; and solid acids (such ion exchange resins). The amount of the hydrolysis catalyst is preferably in the range of from 0.001 to 5 moles per mole of the hydrolyzable group bonded to silicon atoms.

Examples of conventional curing catalysts include basic compounds, such as sodium hydroxide, potassium hydroxide, sodium methylate, sodium acetate, tetramethylammonium chloride and tetramethylammonium hydroxide; amine compounds, such as tributyl amine, diazabicycloundecene, ethylene diamine, diethylene triamine, an ethanol amine, γ-aminopropyltrimethoxysilane and γ-(2-aminoethyl)-aminopropyltrimethoxysilane; titanium compounds, such as tetraisopropyl titanate and tetrabutyl titanate; aluminum compounds, such as aluminum triisopropoxide, aluminum acetylacetonate, aluminum perchlorate and aluminum chloride; tin compounds, such as tin acetylacetonate, dibutyltin octylate and dibutyltin dilaurate; metal-containing compounds, such as cobalt octylate, cobalt acetylacetonate and iron acetylacetonate; and acidic compounds, such as phosphoric acid, nitric acid, phthalic acid, p-toluenesulfonic acid and trichloroacetic acid.

In the photocatalyst composition of the present invention, when the phenyl group-containing silicone (BP) represented by formula (4) above contains an Si—H group, it is preferred that a crosslinking agent, such as a multifunctional alkenyl compound, is added to the silicone (BP) in an amount such that the amount of the alkenyl group of the crosslinking agent is 0.01 to 2 equivalents, more advantageously 0.1 to 1 equivalent, per equivalent of the Si—H group of the silicone. With respect to the multifunctional alkenyl compound, there is no particular limitation as long as the alkenyl group of the multifunctional alkenyl compound reacts with the Si—H group of the silicone to thereby promote the curing of the binder component. In general, an alkenyl group-containing silicone having a C$_2$–C$_{30}$ monovalent unsaturated hydrocarbon group (such as a vinyl group, an allyl group or a hexenyl group) is used as a multifunctional alkenyl compound.

In addition, for promoting the reaction between the Si—H group of the silicone and the multifunctional alkenyl compound, a catalyst may be used in an amount of from 1 to 10,000 ppm, preferably from 1 to 1,000 ppm, based on the total amount of the phenyl group-containing silicone (BP) and the multifunctional alkenyl compound. As such catalysts, platinum group metal-containing catalysts, i.e., compounds of ruthenium, rhodium, palladium, osmium, iridium or platinum are suitable. Of these, platinum compounds and palladium compounds are preferred. Examples of such platinum compounds include platinum(II) chloride, hydrogen tetrachloroplatinate(II), platinum(IV) chloride, hydrogen hexachloroplatinate(IV), ammonium hexachloroplatinate (IV), potassium hexachloroplatinate(IV), platinum(II) hydroxide, platinum(IV) dioxide, dichloro(dicyclopentadienyl)platinum(II), a platinum-vinylsiloxane complex, a platinum-phosphine complex, a platinum-olefin complex and metallic platinum, wherein metallic platinum is used either without a carrier or in such a form as carried on a carrier, such as alumina, silica, activated carbon or the like. Examples of palladium compounds used as catalysts for promoting the reaction between the Si—H group of the silicone and the multifunctional alkenyl compound include palladium(II) chloride, ammonium chlorotetraaminepalladate (II) and palladium(II) oxide. The platinum group metal-containing catalyst is generally used in an amount of from 5 to 1,000 ppm, based on the total amount of the Si—H group-containing silicone and the multifunctional alkenyl compound; however, the amount of the catalyst can be appropriately changed depending on the reactivity, cost and desired curing rate. If desired, a catalyst inhibitor, such as an organic nitrogen compound, an organic phosphorus compound or an acetylene compound, may be used to suppress the catalytic activity of the platinum group metal-containing catalyst and extend the pot life of the photocatalyst composition.

Furthermore, if desired, resin (E) may be added to the photocatalyst composition of the present invention in an amount such that the weight ratio of modified photocatalyst (A) to resin (E) (i.e., (A)/(E) weight ratio) is in the range of from 0.1/99.9 to 99/1, preferably from 1/99 to 90/10.

Any synthetic resin and any natural resin may be used as resin (E) in the photocatalyst composition of the present invention. With respect to the form of resin (E), there is no particular limitation. Resin (E) may be in the form containing no solvent (such as, a pellet form, a powder form or a liquid form) or in the form of a solution or dispersion thereof in a solvent.

Thermoplastic resins and curable resins (such as, a heat curable resin, a photocurable resin or a moisture curable resin) may be used as the above-mentioned synthetic resins. Specific examples of synthetic resins used as resin (E) include an acrylic resin, a methacrylic resin, a fluororesin, an alkyd resin, an aminoalkyd resin, a vinyl resin, a polyester resin, a styrene-butadiene resin, a polyolefin resin, a polystyrene resin, a polyketone resin, a polyamide resin, a polycarbonate resin, a polyacetal resin, a polyether ether ketone resin, a polyphenylene oxide resin, a polysulfone resin, a polyphenylene sulfone resin, a polyether resin, a polyvinyl chloride resin, a polyvinylidene chloride resin, a urea resin, a phenol resin, a melamine resin, an epoxy resin, a urethane resin, a silicone-acrylic resin and a silicone resin.

Specific examples of natural polymers include cellulose resins, such as nitrocellulose; isoprene resins, such as a natural rubber; protein resins, such as casein; and starch.

As resin (E) used in the present invention, preferred is a polymer having a silyl group at the terminal(s) of a main chain thereof and/or in a side chain(s) thereof, wherein the silyl group contains a silicon atom having bonded thereto a hydroxyl group and/or at least one hydrolyzable group selected from the group consisting of a $C_1$–$C_{20}$ alkoxy group, an enoxy group, a $C_1$–$C_{20}$ acyloxy group, an aminoxy group, a $C_1$–$C_{20}$ oxime group and a halogen atom. Such a polymer is preferred because it is relatively insusceptible to decomposition by the action of the photocatalyst.

Furthermore, for improving the hardness, abrasion resistance and hydrophilicity of a film produced from the photocatalyst composition, microparticles of a metal oxide, such as silica, alumina, zirconium oxide, antimony oxide or a rare earth metal oxide, in the form of a powder or a sol, may be added to the photocatalyst composition. However, the microparticles of metal oxides are incapable of functioning as a binder like binder component (B) used in the present invention. Specifically, like the photocatalyst particles, the microparticles of metal oxides cause a lowering of the flexibility (i.e., flexing resistance and impact resistance) of a film or shaped article. Therefore, it is preferred that the metal oxide is used in an amount such that the total weight of modified photocatalyst (A) and the metal oxide contained in the film (or shaped article) formed from the photocatalyst composition is 50% by weight or less, based on the weight of the film (or shaped article).

There is no particular limitation with respect to the form of the photocatalyst composition of the present invention, and the photocatalyst composition may be in the form containing no solvent (i.e., a liquid or a solid) or in the form of a dispersion or suspension thereof in a solvent.

Examples of solvents used for dispersing or suspending the photocatalyst composition of the present invention include water; alcohols, such as ethylene glycol, butyl cellosolve, n-propanol, isopropanol, n-butanol, ethanol and methanol; aromatic hydrocarbons, such as toluene and xylene; aliphatic hydrocarbons, such as hexane, cyclohexane and heptane; esters, such as ethyl acetate and n-butyl acetate; ketones, such as acetone, methyl ethyl ketone and methyl isobutyl ketone; ethers, such as tetrahydrofuran and dioxane; amides, such as dimethylacetamide and dimethylformamide; halogenated compounds, such as chloroform, methylene chloride and carbon tetrachloride; dimethyl sulfoxide; and nitrobenzene. These solvents may be used individually or in combination.

When the photocatalyst composition of the present invention is used as a coating agent, it is preferred that the photocatalyst composition of the present invention is in the form of a dispersion or suspension thereof in a solvent. The ratio of the photocatalyst composition to the solvent in the dispersion or suspension is generally in the range of from 0.01 to 95% by weight, preferably from 0.1 to 70% by weight, in terms of the solids content (content of the photocatalyst composition) of the dispersion or suspension.

As methods for preparing a dispersion or suspension of the photocatalyst composition, there can be mentioned the following methods ① to ④:

① a method in which a dispersion or suspension of modified photocatalyst (A) in the above-mentioned solvent is mixed with a dispersion or suspension of binder component (B) in the above-mentioned solvent;

② a method in which a dispersion or suspension of modified photocatalyst (A) in the above-mentioned solvent is mixed with binder component (B) in the form containing no solvent;

③ a method in which a dispersion or suspension of binder component (B) in the above-mentioned solvent is mixed with modified photocatalyst (A) in the form containing no solvent; and ④ a method in which a mixture of modified photocatalyst (A) and binder component (B) is mixed with the above-mentioned solvent.

Among the above-mentioned examples of methods for preparing a dispersion or suspension of the photocatalyst composition, methods ① and ② are preferred because there can be obtained a coating agent which exhibits excellent dispersion of modified photocatalyst (A).

When the photocatalyst composition of the present invention is used as a coating agent, the photocatalyst composition comprises modified photocatalyst (A), binder component (B) and, optionally, a solvent. Alternatively, the photocatalyst composition used as a coating agent may further comprises coating resin composition (E1) in an amount such that the weight ratio of modified photocatalyst (A) to coating resin composition (E1) ((A)/(E1) weight ratio) is in the range of from 1/99 to 99/1, preferably from 10/90 to 90/10.

With respect to coating resin composition (E1), there is no particular limitation, and any conventional coating resin composition may be used. Examples of coating resin compositions include an oil paint, a lacquer, a solvent type synthetic resin paint, an aqueous synthetic resin paint (such as an emulsion type paint and an aqueous resin type paint), a non-solvent type synthetic resin paint (such as a powder paint), an inorganic paint and an electrical insulating paint. Modified photocatalyst (A), binder component (B), optionally a solvent and optionally coating resin composition (E1) may be mixed together by any conventional methods, but it is preferred that the mixing is performed by a method which does not lower the dispersibility of modified photocatalyst (A) (e.g., a method which employs a modified photocatalyst sol). If desired, the components for the photocatalyst composition may be homogenously mixed together by using conventional mixers for preparing a coating composition, such as a ball mill, a paint shaker, a sand mill, a jet mill, a three-roll mill and a kneader.

Further, if desired, additives generally added to conventional coating compositions may be chosen according to various purposes and added to the photocatalyst composition of the present invention. Examples of these additives include a pigment, a filler, a disperser, a light stabilizer, a wetting agent, a thickener, a rheology-controlling agent, an anti-foaming agent, a plasticizer, a film-forming assistant, a rust preventive agent, a dye, a preservative and the like. Such additives can be used individually or in combination.

In the photocatalyst composition of the present invention, modified photocatalyst particles used as modified photocatalyst (A) are modified with modifier compound (b) having a very low surface energy. By virtue of the use of such modified photocatalyst (A), the photocatalyst composition of the present invention which comprises modified photocatalyst (A) and binder component (B) comprising phenyl group-containing silicone (BP), exhibits a self-stratifying or self-gradating property with respect to the distribution of the modified photocatalyst particles (A). Herein, as described above, the term "self-stratifying or self-gradating property" is defined as a property that, when the photocatalyst composition of the present invention is shaped into a film or shaped article, during the shaping of the photocatalyst composition, the modified photocatalyst particles (A) in the photocatalyst composition are autonomously distributed to form a structure having a concentration gradient of the modified photocatalyst particles, wherein the autonomous distribution occurs in accordance with the properties (especially hydrophilicity and hydrophobicity) of a surface contacting the film or shaped article.

When there is a difference in the properties (especially hydrophilicity and hydrophobicity) as between the film or shaped article and the surface which is in contact with the film or shaped article, the concentration gradient is formed in accordance with the level of the difference. Specifically, the concentration of the modified photocatalyst particles (A) forms a gradient from one surface of the film toward the other surface of the film or a gradient from the inner portion of the shaped article toward the surface of the shaped article.

For example, when a photocatalyst composition having the above-mentioned self-stratifying or self-gradating property is coated on a substrate to thereby obtain a film, the obtained film has a stratified or gradated structure in which the modified photocatalyst particles have a concentration gradient in the thickness-wise direction of the film, wherein the concentration of the modified photocatalyst particles increases from a surface of the film which contacts the substrate toward the other, exposed surface of the film which is not in contact with the substrate (e.g., toward the surface of the film which is exposed to the air). In the thus obtained film, improvement in the photocatalyst activity and hydrophilicity of the film is exhibited when the relative modified photocatalyst content (i.e., relative concentration of the modified photocatalyst) in the surface portion on the exposed surface side of the film (which is not in contact with the substrate) is 120 or more, relative to the concentration value 100 of the modified photocatalyst of the whole film. It is preferred that the relative concentration of the modified photocatalyst particles (A) in the surface portion on the exposed surface side of the film (which is not in contact with the substrate) is 150 or more, more advantageously 200 or more, relative to the concentration value 100 of the modified photocatalyst of the whole film. On the other hand, when the relative concentration of the modified photocatalyst particles (A) in the surface portion on the non-exposed surface side of the film (which contacts the substrate) is 80 or less, relative to the concentration value 100 of the modified photocatalyst of the whole film, there can be exhibited the effect of preventing deterioration from occurring at the interface between the film and the substrate. It is preferred that the relative concentration of the modified photocatalyst particles (A) in the surface portion on the non-exposed surface side of the film (which contacts the substrate) is 50 or less, more advantageously 10 or less, relative to the concentration value 100 of the modified photocatalyst of the whole film.

When the self-stratifying or self-gradating property of the photocatalyst composition of the present invention is extremely high (in other words, when the relative concentration of the modified photocatalyst particles (A) in the surface portion on the exposed surface side of the film (which is not in contact with the substrate) is preferably 150 or more, more preferably 200 or more, relative to the concentration value 100 of the modified photocatalyst of the whole film), a film or shaped article formed from the photocatalyst composition of the present invention exhibits excellent hydrophilicity (superhydrophilicity: a contact angle of water is 10° or less as measured at 20° C.) and the excellent photocatalyst activity by light irradiation, even when the modified photocatalyst content of the photocatalyst composition is very low, namely, even when the weight ratio of modified photocatalyst (A) to binder component (B) in the photocatalyst composition ((A)/(B) weight ratio) is in the range of from 0.1/99.9 to 40/60, more preferably from 0.1/99.9 to 30/70. In such a film or shaped article having very low photocatalyst content, the properties of the silicone as binder component (B) are strongly exhibited and, as a result, the film or shaped article has excellent properties with respect to strength, flexibility (flexing resistance and impact resistance) and the like.

When a shaped article formed from the photocatalyst composition of the present invention and a functional composite obtained by forming on a substrate a film comprising the photocatalyst composition are irradiated with light, both the shaped article and the functional composite are capable of not only exhibiting excellent hydrophobicity or hydrophilicity and/or photocatalyst activity, but also performing photoelectric conversion function. Accordingly, in another aspect of the present invention, there is provided a shaped article produced from the above-mentioned photocatalyst composition and a functional composite obtained by forming a film comprising the photocatalyst composition on a substrate.

With respect to the substrate used for obtaining the functional composite of the present invention, there is no particular limitation. For example, there can be used any substrates generally used in the application fields described herein.

Specific examples of substrates usable for obtaining the functional composite of the present invention include organic substrates, such as synthesized resins and natural resins; inorganic substrates, such as metals, ceramics, glasses, stones, cements and concretes; and combinations of the above-mentioned substrates.

The functional composite of the present invention exhibits high durability even when it uses an organic substrate which is decomposed by the action of photocatalysts. That is, the photocatalyst composition of the present invention enables the production of a functional composite having high durability, even when using an organic substrate which was not used in the prior art due to the problem of poor durability.

An explanation is made below with respect to examples of methods employed in the present invention for obtaining a functional composite or a shaped article from the photocatalyst composition. For example, when the photocatalyst composition is provided in the form of a coating agent, a functional composite is obtained by applying the coating agent onto a substrate, followed by drying to form a dry coating, and if desired, the dry coating is subjected to heat treatment or the like at 20 to 500° C., preferably 40 to 250° C., thereby obtaining a functional composite. Examples of methods for applying the coating agent onto a substrate include a spray coating method, a flow coating method, a roll coating method, a brush coating method, a dip coating method, a spin coating method, a screen printing method, a casting method, a gravure printing method and a flexographic printing method.

In the above-mentioned method for obtaining a functional composite, the thickness of the film comprising the photocatalyst composition is generally from 0.1 to 200 μm, preferably from 0.1 to 50 μm, more preferably from 0.5 to 10 μm.

The method for producing the functional composite of the present invention is not limited to the above-mentioned method in which a film comprising the photocatalyst composition of the present invention is formed on a substrate. For example, the functional composite may be produced by a method in which a substrate and a film comprising the photocatalyst composition are molded simultaneously (i.e., by one-piece molding). Alternatively, there can be mentioned a method in which a photocatalyst composition is shaped into a film and, then, a substrate is formed by molding. In addition, the functional composite may be produced by a method in which a substrate and a film comprising the photocatalyst composition are separately prepared by molding, and the prepared substrate and the film are adhered or fused to each other, to thereby obtain a functional composite. In the above-mentioned methods, when the photocatalyst composition is shaped into a film under conditions wherein the catalyst composition is not in contact with the substrate for the functional composite (i.e., when the substrate for the functional composite is not used in the preparation of the film), the raw material for the substrate is not limited and may be arbitrarily selected. That is, in this case, the raw material for the substrate is not limited to a solid form, and it may be in the form of a liquid or gas, so long as the effects of the present invention are not impaired.

If desired, the photocatalyst composition of the present invention may be subjected to molding by any conventional methods employed for molding a resin, to thereby obtain the shaped article or functional composite of the present invention in the form of a film, a sheet, a block, pellets or any complicated shape. Further, if desired, the photocatalyst composition may be used in combination with an optional resin, so long as the effects of the present invention are not impaired.

When the photocatalyst composition is subjected to molding or when the photocatalyst composition is mixed with an optional resin, any of the photocatalyst composition and the optional resin may be used in the form of a powder or pellets. Such powder or pellets may contain a liquid component. Further, when the photocatalyst composition is used in combination with the optional resin, the resultant resin mixture containing the photocatalyst composition and the optional resin may be formed into pellets by any of the below-mentioned molding methods and, then, subjected to molding to thereby obtain the shaped article or functional composite of the present invention. The pellets of the above-mentioned resin mixture may be in the form of the so-called "master batch" in which the photocatalyst composition is contained at a high concentration.

In the present invention, molding can be performed by extrusion molding, injection molding, press molding and the like. Further, depending on the type of the optional resin used, for example, when the optional resin is a thermoplastic resin, calender molding can be employed. Furthermore, there can be used a method in which a reinforcing material, such as organic fibers (e.g., a natural fiber), inorganic fibers (e.g., glass) or a fabric of any of these fibers, is impregnated with the photocatalyst composition or the above-mentioned resin mixture (i.e., a mixture of the photocatalyst composition and an optional resin), and the resultant is subjected to molding.

The shaped article or functional composite of the present invention may be in the form of fibers. Such fibers of the shaped article or functional composite can be produced from the photocatalyst composition of the present invention by any conventional spinning methods as long as the effects of the present invention are not impaired. As such spinning methods, there can be mentioned a melt spinning method or a solvent spinning method. The photocatalyst composition may be subjected to spinning together with the above-mentioned optional resin to thereby obtain fibers. For example, conventional resins (a thermoplastic resin is preferred from the viewpoint of moldability), such as a polyester and a nylon, may be blended into the photocatalyst composition of the present invention. Alternatively, the photocatalyst composition and the above-mentioned conventional resin may be subjected to bicomponent spinning (such as sheath-core bicomponent spinning and side-by-side bicomponent spinning), to thereby obtain a composite fiber.

The above-mentioned fibers of the shaped article or functional composite of the present invention may be a long fiber or a short fiber. Further, the thickness of the fiber may be uniform or non-uniform in the lengthwise direction of the fiber. Furthermore, the cross-section of the fiber may be a circle, a polygon (such as a triangle, an L-shape, a T-shape, a Y-shape, a W-shape, an octofoil shape or a dog-bone shape), a multifoil shape, a hollow shape, or an indefinite shape.

Further, the fibers of the shaped article or functional composite of the present invention may be used in the form of a woven fabric or a nonwoven fabric (using either short fibers or long fibers).

Furthermore, the above-mentioned fibers may be in the form of yarns or a mass of yarns, such as a yarn in a cheese form, a woven fabric, a knitted material and a nonwoven fabric. The yarns may be used in combination with a fibrous, optional resin. The yarns may be in the form of spun yarns, such as raw material yarns, textured yarns (including draw-textured yarns), pretwisted textured yarns, air textured yarns, ring spun yarns and open end yarns; multifilament raw material yarns (including extra fine yarns); or combined filament yarns. Examples of fibrous, optional resins which can be used in the present invention include synthetic fibers, such as a polyester fiber, a polyamide fiber, a polyacrylic fiber, a polyvinyl fiber, a polypropylene fiber and elastic fibers, for example a polyurethane fiber (wherein these fibers may contain an inhibitor against a chlorine water deterioration, such as metal oxides (e.g., magnesium oxide and zinc oxide) and metal hydroxides); natural fibers, such as a cotton fiber, a hemp fiber, a wool fiber and a silk fiber; cellulose fibers, such as a cupro fiber, a rayon fiber and a polynosic fiber; and acetate fibers.

The shaped article or functional composite of the present invention which is in the above-mentioned fiber form can be used for producing clothes and filters for filtering liquids or gases, the clothes and filters having various functions, such as antibacterial function, stain resistance function, a smell prevention function and a poisonous gas-decomposing function.

When the shaped article and functional composite produced from the photocatalyst composition of the present invention are irradiated with light having energy which is larger than the band gap energy of the modified photocatalyst contained in the composition, the shaped article and functional composite exhibit hydrophobicity or hydrophilicity and/or the photocatalyst activity. Further, the shaped article and functional composite perform photoelectric conversion function by light irradiation.

In the present invention, as examples of light having energy which is larger than the band gap energy of the modified photocatalyst, there can be mentioned light obtained in the general residential environment (such as sunlight and room light), black light, light emitted from a xenon lamp or a mercury-vapor lamp and the like.

When the above-mentioned shaped article or functional composite provided in the present invention exhibits the photocatalyst activity, such as the activity to decompose organic substances, such a shaped article or functional composite performs various functions, such as an antibacterial function, a staining resistance function, a smell prevention function and an $NO_X$-decomposing function. Therefore, such a shaped article or functional composite can be used in various fields, such as the fields of environmental clean-up, for example, clean-up of the atmosphere, water or the like.

When the above-mentioned shaped article or functional composite provided in the present invention has a characteristic that, when its surface is irradiated with light, water exhibits a contact angle against the surface of 60° or less (preferably 10° or less) at 20° C., i.e., the surface exhibits hydrophilicity, such a shaped article or functional composite (a hydrophilic shaped article or hydrophilic film and a substrate covered with a hydrophilic film) can be utilized in, for example, the techniques for preventing fogging from occurring on a mirror or a glass, the techniques for preventing dirt from adhering to a building exterior, the antistatic techniques or the like.

Examples of application fields in which the shaped article or functional composite of the present invention can be utilized for imparting staining resistance properties, include the fields of a building material, a building exterior, a building interior, a window frame, a window glass, a structural member and building facilities for a residence or the like (particularly, a toilet, a bathtub, a washstand, a lighting equipment, a light shade, a kitchenware, a tableware, a dish washer, a dish dryer, a sink, a kitchen range, a kitchen hood and an exhaust fan). Further examples of application fields include the fields of an exterior for vehicles, a coating for vehicles, and an interior for vehicles, such as a cover for a lighting of a vehicle, a window glass, a meter and a display panel (wherein these interior parts for vehicles are required to have high transparency). In addition, the shaped article or functional composite of the present invention can also be used in the application fields of an exterior for machines and other articles; a dust-proof cover and a dust-proof coating; a display device and a cover therefor; a traffic sign; various display apparatuses; an exhibition equipment (such as an advertisement tower); a sound barrier for a road or railroad; a bridge; an exterior and a coating for a guardrail; an interior for a tunnel and a coating for a tunnel; an insulator; exteriors (especially transparent components thereof) for electronic or electric equipments used outdoors, such as a cover for a solar cell and a cover for a heat collector of a solar water heater; and exteriors (especially transparent components thereof) for a plastic greenhouse and a greenhouse. The shaped article or functional composite can be also utilized in the application fields of clinical or gymnastic facilities and equipments which are used indoors but are likely to be exposed to staining.

Examples of application fields in which the shaped article or functional composite of the present invention can be utilized for preventing the occurrence of fogging include the fields of mirrors (e.g., a rear view mirror of an automobile, a mirror for a bathroom, a mirror for a toilet, a dental mirror and a road mirror), lenses (e.g., a lens for eye glasses, an optical lens, a lens for a lighting, a lens for a semiconductor, a lens for a copier and a rear view camera lens of an automobile), a prism, a window glass for a building or observation tower, a window glass for vehicles (such as an automobile, a railcar, an airplane, a ship, a submarine, a snow vehicle, a gondola of a ropeway, a gondola used in an amusement park, and a space craft), a windshield for vehicles (such as an automobile, a motorcycle, a railcar, an airplane, a ship, a submarine, a snow vehicle, a snowmobile, a gondola of a ropeway, a gondola used in an amusement park, and a space craft), a protective goggle, a sport goggle, a shield of a protective mask, a shield of a sport mask, a shield of a helmet, a glass of a display freezer for frozen foods, a glass of a display case for warmed foods, a cover for a measuring instrument, a cover for a rear view camera lens of an automobile, a condenser lens for a dental laser equipment and the like, a cover for laser measurement sensors (such as a vehicle distance sensor), a cover for an infrared sensor and a filter for a camera.

Examples of application fields in which the shaped article or functional composite of the present invention can be utilized for providing antistatic properties include the fields of a cathode ray tube; a magnetic recording media; an optical recording media; a magneto-optical recording media; an audio tape; a video tape; an analog record; a housing, part, exterior and coating for household electric appliances; a housing, a part, an exterior and a coating for office automation machines; a building material; a building exterior; a building interior; a window frame; a window glass; a structural member; an exterior and a coating for vehicles; an exterior for machines and various articles; a dust-proof cover and a dust-proof coating.

When the above-mentioned shaped article or functional composite provided in the present invention has a characteristic that, when its surface is irradiated with light, water exhibits a contact angle against the surface of 70° or more (preferably 90° or more) at 20° C., i.e., the surface exhibits hydrophobicity, such a shaped article or functional composite (a hydrophobic shaped article or hydrophobic film and a substrate covered with a hydrophobic film) can be utilized in, for example, the techniques for imparting water-repellent properties, the techniques for preventing adhesion of aqueous dirt, the techniques for preventing dirt adhesion by washing with a flow of water, and the techniques for preventing adhesion of ice and snow. Therefore, the shaped article or functional composite can be advantageously used in various application fields, such as a window glass, a windshield, a mirror, a lens, a goggle, a cover, an insulator, a building material, a building exterior, a building interior, a structural member, an exterior and coating for vehicles, an exterior for machines and other articles, various display devices, lighting equipment, residential equipment, tableware, kitchenware, household electric appliances, a roofing material, an antenna, an electricity transmission cable and equipments for sliding on ice and snow.

When the above-mentioned shaped article or functional composite provided in the present invention performs a photoelectric conversion function, such a shaped article or functional composite can convert, for example, solar energy into electric power. Therefore, such a shaped article or functional composite can be used in various application fields, such as an optical semiconductor electrode used for a (wet-type) solar cell.

Further, with respect to a member provided in the present invention which member has a characteristic that its water contact characteristic can be changed by light irradiation (change from hydrophobic to hydrophilic or change from hydrophilic to hydrophobic), such a member can be very advantageously used in, for example, an offset printing plate.

BEST MODE FOR CARRYING OUT THE INVENTION

The present invention will be described in more detail with reference to the following Examples, Reference Examples and Comparative Examples, which should not be construed as limiting the scope of the present invention.

In the Examples, Reference Examples and Comparative Examples, various properties were measured and evaluated as follows.

(1) Measurements of the Particle Size Distribution and the Number Average Particle Diameter:

An appropriate amount of a solvent was added to a sample sol or composition containing particles so that the sample was diluted to have a solids content of from 1 to 20% by weight. With respect to the resultant diluted sample, the particle size distribution and number average particle diameter of the particles contained therein were measured by a wet-type particle size analyzer (Microtrac UPA-9230, manufactured and sold by Nikkiso Co., Ltd., Japan).

(2) Measurement of the Weight Average Molecular Weight:

The weight average molecular weight was measured by gel permeation chromatography (GPC), utilizing a calibration curve obtained with respect to standard polystyrene samples.

The GPC was performed under the following conditions.

Apparatus: chromatograph model HLC-8020 LC-3A (manufactured and sold by Tosoh Corporation, Japan);

Columns: TSKgel G1000H$_{XL}$, TSKgel G2000H$_{XL}$ and TSKgel G4000H$_{XL}$ (each of which is manufactured and sold by Tosoh Corporation, Japan), connected in series;

Data processor: data processor model CR-4A (manufactured and sold by Shimadzu Corporation, Japan);

Eluent: tetrahydrofuran (for analyzing a phenyl group-containing silicone) or chloroform (for analyzing a silicone containing no phenyl group);

Flow rate: 1.0 ml/min;

Method for preparing a sample for GPC: A sample compound to be analyzed by GPC was dissolved in an appropriate amount of a solvent used as an eluent so that the resultant solution has a sample compound concentration within the range of from 0.5 to 2% by weight, thereby obtaining a sample solution. The obtained sample solution was subjected to GPC.

(3) Infrared Absorption (IR) Spectrum:

IR spectrum was obtained by infrared spectrometer model FT/IR-5300 (manufactured and sold by Japan Spectroscopic Co., Ltd., Japan).

(4) Measurement of $^{29}$Si Nuclear Magnetic Resonance:

$^{29}$Si nuclear magnetic resonance (NMR) was measured by JNM-LA400 (manufactured and sold by JAPAN ELECTRON OPTICS LABORATORY CO., LTD., Japan).

(5) Hardness of a Coating:

The hardness of a coating was determined in terms of a pencil hardness (i.e., formation of a scratch on a coating by a pencil) measured in accordance with JIS-K5400.

(6) Hardness of a Coating after Ultraviolet Light Irradiation:

The surface of a coating was irradiated with ultraviolet light (hereinafter referred to as "UV light") emitted from FL20S BLB black light (manufactured and sold by TOSHIBA LIGHTING AND TECHNOLOGY CO., LTD., Japan) for 7 days, and the hardness of the thus treated coating was measured by the method described in item (5) above.

With respect to the UV light irradiation, the intensity of UV light was adjusted to 1 mW/cm$^2$, as measured by UV Radiometer Model UVR-2 (manufactured and sold by TOPCON CO., LTD., Japan), which was used in combination with Detector Model UD-36 (manufactured and sold by TOPCON CO., LTD., Japan), which is a photodetector for detecting light having a wavelength of from 310 to 400 nm.

(7) Measurement of the Contact Angle of Water Against the Surface of a Coating:

A drop of deionized water was placed on the surface of a coating and allowed to stand at 20° C. for 1 minute. Then, the contact angle of the water drop against the surface of the coating was measured by Contact Angle Meter model CA-X150, manufactured and sold by KYOWA INTERFACE SCIENCE CO., LTD, Japan.

The smaller the contact angle of water against the surface of the coating, the more hydrophilic the surface of the coating.

(8) How the Hydrophilicity (or Hydrophobicity) of the Surface of a Coating is Changed by Ultraviolet Light Irradiation:

The surface of a coating was irradiated with UV light by the method mentioned described in item (6) above for 7 days, and the contact angle of water against the surface of the UV light irradiated coating was measured by the method described in item (7) above.

(9) Evaluation of the Photocatalyst Activity Exhibited at the Surface of a Coating:

A 5% by weight ethanol solution of methylene blue was coated on the surface of a coating, and the resultant coating was irradiated with UV light by the method described in item (6) above for 5 days.

The surface of the coating after the UV light irradiation was visually observed with respect to the degree of fading of the blue color of methylene blue (in other words, the degree of decomposition of methylene blue by the action of the photocatalyst). The photocatalyst activity exhibited at the surface of the coating was evaluated, based on the degree of decomposition of methylene blue, by the following 3 criteria:

⊚: methylene blue is completely decomposed;

Δ: blue color of methylene blue slightly remains; and x: almost no decomposition of methylene blue is observed.

(10) Weathering Resistance of a Coating (Gloss Retention Value):

A coating was subjected to an atmospheric exposure test (cycle test conditions: exposure to light at 60° C. for 4 hours, followed by exposure to dark and humid environment at 40° C. for 4 hours) by Dewpanel light control weather meter (model DPWL-5R, manufactured and sold by SUGA TEST INSTRUMENTS Co., Ltd., Japan). After performing the atmospheric exposure test for 1,000 hours, the 60° —60° mirror reflection ratio of the resultant coating was measured to determine a final gloss value. The obtained final gloss value was divided by an initial gloss value (i.e., the gloss value of the coating before subjected to the atmospheric exposure test), to thereby obtain a gloss retention value.

(11) Evaluation of the Stratified or Gradated Structure of a Coating Produced from a Photocatalyst Composition:

A sample of a coating produced from a photocatalyt composition was embedded in an epoxy resin (Quetol 812; manufactured and sold by NISSHIN EM Co., Ltd., Japan), thereby obtaining an epoxy resin-embedded sample. The obtained epoxy resin-embedded sample was cut by a microtome (ULTRACUT-N type microtome; manufactured and sold by Reichert, Germany) to prepare an ultrathin section (thickness: 50 to 60 nm) of the sample, and the ultrathin section was placed on a mesh having a support membrane attached thereto. Subsequently, the ultrathin section was subjected to $RuO_4$ steam staining for about minutes, followed by carbon deposition to thereby obtain a specimen for microscopic observation. The obtained specimen was observed through TEM (transmission electron microscope).

The TEM observation was performed under the following conditions:

Apparatus: HF 2000 (manufactured and sold by Hitachi, Ltd., Japan); and

Acceleration voltage: 125 kV.

The position of titanium oxide particles used as a photocatalyst was analyzed by an EDX analysis of elemental titanium.

Further, a cross-section of a film formed on an acrylic urethane coating on an aluminum plate was observed through TEM, as follows. A film formed on an acrylic urethane coating on an aluminum plate was cut by a dicing saw (model DAD 321, manufactured and sold by DISCO ENGINEERING SERVICE, LTD., Japan) and, then, the resultant cross-section was subjected to FIB (Focused Ion Beam) processing, thereby obtaining a specimen for microscopic observation. The obtained specimen was observed through TEM.

The FIB processing was performed under the following conditions:

Apparatus: FB 2000 (manufactured and sold by Hitachi, Ltd., Japan);

Processing condition: acceleration voltage (30 kV); and

Ion source: Ga.

The TEM observation was performed under the following conditions:

Apparatus: HF 2000 (manufactured and sold by Hitachi, Ltd., Japan); and

Acceleration voltage: 200 kV.

(12) Impact Resistance:

The impact resistance was evaluated by the Dupont method (500 g×50 cm) in accordance with JIS-K5400.

REFERENCE EXAMPLE 1

Synthesis of Phenyl Group-Containing Silicone (BP1-1)

78 g of dioxane was charged into a reactor equipped with a reflux condenser, a thermometer and a stirrer, and 26.0 g of phenyltrichlorosilane was added thereto, followed by stirring at room temperature for about 10 minutes. To the resultant mixture was dropwise added a mixture of 3.2 g of water and 12.9 g of dioxane over about 30 minutes while maintaining the internal temperature of the reactor at 10 to 15° C., followed by stirring at 10 to 15° C. for about 30 minutes and, then, at 60° C. for 3 hours, thereby obtaining a first reaction mixture. The obtained reaction mixture was cooled to 25 to 30° C. and 392 g of toluene was dropwise added to the cooled reaction mixture over about 30 minutes. Subsequently, the temperature of the resultant mixture was elevated to 60° C., followed by further stirring for 2 hours at 60° C., thereby obtaining a second reaction mixture.

The second reaction mixture was cooled to 10 to 15° C., followed by addition of 19.2 g of methanol over about 30 minutes. The resultant mixture was stirred at 25 to 30° C. for about 2 hours and, then, the temperature of the resultant mixture was elevated to 60° C., followed by further stirring for 2 hours, thereby completing the reaction. The resultant reaction mixture was subjected to reduced pressure distillation at 60° C. to distill off the solvents from the reaction mixture, thereby obtaining a phenyl group-containing silicone (BP1-1) having a ladder-shaped skeleton and a weight average molecular weight of 3,600. (In the IR spectrum of the obtained phenyl group-containing silicone (BP1-1), absorptions at 1,130 $cm^{-1}$ and 1,037 $cm^{-1}$, which are ascribed to the stretching vibrations of the ladder-shaped skeleton, were observed.)

In addition, from the results of a $^{29}Si$ nuclear magnetic resonance analysis of the obtained phenyl group-containing silicone (BP1-1), it was found that phenyl group-containing silicone (BP1-1) is represented by the following formula:

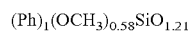

$$(Ph)_1(OCH_3)_{0.58}SiO_{1.21}$$

wherein Ph represents a phenyl group.

REFERENCE EXAMPLE 2

Synthesis of Alkyl Group-Containing Silicone (BA-1)

300 g of methanol was charged into a reactor equipped with a reflux condenser, a thermometer and a stirrer, and 136 g (1 mole) of methyltrimethoxysilane and 120 g (1 mole) of dimethyldimethoxysilane were added thereto, followed by stirring at room temperature for about 10 minutes. To the resultant mixture was dropwise added a mixture of 12.6 g (0.7 mole) of a 0.05N aqueous hydrochloric acid solution and 63 g of methanol over about 40 minutes while cooling the reactor with ice, thereby effecting a hydrolysis reaction. Subsequently, the resultant mixture was further stirred at 10° C. or less for about 20 minutes and, then, at room temperature for 6 hours, thereby obtaining a reaction mixture.

The obtained reaction mixture was subjected to reduced pressure distillation at 60° C. to distill off the solvents from the reaction mixture, thereby obtaining an alkyl group-containing silicone (BA-1) having a weight average molecular weight of 3,600. The structure of the obtained alkyl group-containing silicone (BA-1) was determined by $^{29}$Si nuclear magnetic resonance. As a result, a signal ascribed to a T structure and a signal ascribed to a D structure were detected and the ratio of the two signals (T structure signal D structure signal ratio) was 1:1.

In addition, from the results of the $^{29}$Si nuclear magnetic resonance analysis, it was found that alkyl group-containing silicone (BA-1) is represented by the following formula:

$(CH_3)_{1.5}(OCH_3)_{0.27}SiO_{1.12}$.

REFERENCE EXAMPLE 3

Synthesis of Alkyl Group-Containing Silicone (BA-2)

470 g of dioxane was charged into a reactor equipped with a reflux condenser, a thermometer and a stirrer, and 25.8 g of methyltrichlorosilane was added thereto, followed by stirring at room temperature for about 10 minutes. To the resultant mixture was dropwise added a mixture of 4.7 g of water and 18.7 g of dioxane over about 30 minutes while maintaining the internal temperature of the reactor at 10 to 15° C., followed by stirring at 10 to 15° C. for about 30 minutes and, then, at 60° C. for 3 hours, thereby obtaining a reaction mixture.

The obtained reaction mixture was cooled to 10 to 15° C., followed by addition of 30.2 g of methanol over about 30 minutes. The resultant mixture was further stirred at 25 to 30° C. for about 2 hours and, then, the temperature of the resultant mixture was elevated to 60° C., followed by further stirring for 3 hours, thereby completing the reaction. The resultant reaction mixture was subjected to reduced pressure distillation at 60° C. to distill off the solvents from the reaction mixture, thereby obtaining an alkyl group-containing silicone (BA-2) having a weight average molecular weight of 2,800.

From the results of $^{29}$Si nuclear magnetic resonance analysis of the obtained alkyl group-containing silicone (BA-2), it was found that alkyl group-containing silicone (BA-2) is represented by the following formula:

$(CH_3)_1(OCH_3)_{0.62}SiO_{1.19}$.

REFERENCE EXAMPLE 4

Synthesis of Phenyl Group-Containing Silicone (BP1-2)

118.0 g of dioxane was charged into a reactor equipped with a reflux condenser, a thermometer and a stirrer, and 26.0 g of phenyltrichlorosilane was added thereto, followed by stirring at room temperature for about 10 minutes. To the resultant mixture was dropwise added a mixture of 3.2 g of water and 12.9 g of dioxane over about 30 minutes while maintaining the internal temperature of the reactor at 10 to 15° C., followed by stirring at 10 to 15° C. for about 30 minutes and, then, at 60° C. for 3 hours, thereby obtaining a first reaction mixture. The obtained reaction mixture was cooled to 25 to 30° C. and 353 g of toluene was dropwise added to the cooled reaction mixture over about 30 minutes. Subsequently, the temperature of the resultant mixture was elevated to 60° C., followed by further stirring for 2 hours at 60° C., thereby obtaining a second reaction mixture.

The second reaction mixture was cooled to 10 to 15° C., followed by addition of 25.1 g of dimethylchlorosilane. To the resultant mixture was further added a mixture of 1.1 g of water and 4.3 g of dioxane over about 30 minutes while maintaining the internal temperature of the reactor at 10 to 15° C. Subsequently, the resultant mixture was stirred at 25 to 30° C. for about 2 hours and, then, the temperature of the resultant mixture was elevated to 60° C., followed by further stirring for 3 hours, thereby completing the reaction. The resultant reaction mixture was subjected to reduced pressure distillation at 60° C. to distill off the solvents from the reaction mixture, thereby obtaining an Si—H group-containing, phenyl group-containing silicone (BP1-2) having a weight average molecular weight of 1,200. (In the IR spectrum of the obtained phenyl group-containing silicone (BP1-2), an absorption at 2,140 $cm^{-1}$, which is ascribed to the Si—H group, was observed.)

From the results of $^{29}$Si nuclear magnetic resonance analysis of the obtained phenyl group-containing silicone (BP1-2), it was found that phenyl group-containing silicone (BP1-2) is represented by the following formula:

$(Ph)_{0.28}(CH_3)_{0.57}H_{0.29}SiO_{1.44}$ wherein Ph represents a phenyl group.

REFERENCE EXAMPLE 5

Production of Binder Component (B-1)

6 g of phenyl group-containing silicone (BP1-1) synthesized in Reference Example 1 and 3 g of alkyl group-containing silicone (BA-1) synthesized in Reference Example 2 were mixed together and 14.7 g of toluene, 29.8 g of isopropanol and 15.1 g of butyl cellosolve were added thereto. The resultant mixture was stirred at room temperature, to thereby obtain a solution of binder component (B-1).

The formula of the obtained binder component (B-1) was calculated from the chemical formulae of phenyl group-containing silicone (BP1-1) and alkyl group-containing silicone (BA-1). Binder component (B-1) was represented by the following formula:

$(Ph)_{0.67}(CH_3)_{0.5}(OCH_3)_{0.47}SiO_{1.18}$ wherein Ph represents a phenyl group.

REFERENCE EXAMPLE 6

Synthesis of Binder Component (B-2)

235 g of dioxane was charged into a reactor equipped with a reflux condenser, a thermometer and a stirrer, and 25.6 g of methyltrichlorosilane and 15.5 g of phenyltrichlorosilane were added thereto, followed by stirring at room temperature for about 10 minutes. To the resultant mixture was dropwise added a mixture of 6.6 g of water and 26.4 g of dioxane over about 30 minutes while maintaining the internal temperature of the reactor at 10 to 15° C., followed by stirring at 10 to 15° C. for about 30 minutes and, then, at 60° C. for 3 hours, thereby obtaining a first reaction mixture. The obtained reaction mixture was cooled to 25 to 30° C. and 235 g of toluene was dropwise added to the cooled reaction mixture over about 30 minutes. Subsequently, the temperature of the resultant mixture was elevated to 60° C., followed by further stirring for 2 hours at 60° C., thereby obtaining a second reaction mixture.

The second reaction mixture was cooled to 10 to 15° C., followed by addition of 42.8 g of methanol over about 30 minutes. The resultant mixture was stirred at 25 to 30° C. for about 2 hours and, then, the temperature of the resultant mixture was elevated to 60° C., followed by further stirring for 2 hours, thereby completing the reaction. The resultant reaction mixture was subjected to reduced pressure distillation at 60° C. to distill off the solvents from the reaction mixture, thereby obtaining a binder component (B-2) having a weight average molecular weight of 3,100. In addition, from the results of $^{29}$Si nuclear magnetic resonance analysis of the obtained binder component (B-2), it was found that binder component (B-2) is represented by the following formula:

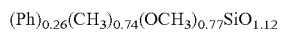

$(Ph)_{0.26}(CH_3)_{0.74}(OCH_3)_{0.77}SiO_{1.12}$ wherein Ph represents a phenyl group.

REFERENCE EXAMPLE 7

Production of Binder Component (B-3)

6 g of alkyl group-containing silicone (BA-2) synthesized in Reference Example 3 and 3 g of alkyl group-containing silicone (BA-1) synthesized in Reference Example 2 were mixed together and 14.7 g of toluene, 29.8 g of isopropanol and 15.1 g of butyl cellosolve were added thereto. The resultant mixture was stirred at room temperature, to thereby obtain a solution of binder component (B-3) containing no phenyl group.

The formula of the obtained binder component (B-3) was calculated from the chemical formulae of alkyl group-containing silicone (BA-2) and alkyl group-containing silicone (BA-1) used. Binder component (B-3) was represented by the following formula:

$(CH_3)_{1.17}(OCH_3)_{0.5}SiO_{1.17}.$

EXAMPLE 1

40 g of TKS-251 (trade name of a titanium oxide organosol; dispersion medium: mixed solvent of toluene and isopropanol, TiO$_2$ content: 20% by weight, average crystallite diameter: 6 nm which is a value described in the catalog) (manufactured and sold by Tayca Corporation, Japan) was charged into a reactor equipped with a reflux condenser, a thermometer and a stirrer. Subsequently, 40 g of a 20% by weight toluene solution of bis(trimethylsiloxy)methylsilane was charged into the reactor over about 5 minutes at 50° C., and the resultant mixture in the reactor was stirred at 50° C. for 12 hours to thereby obtain modified photocatalyst organosol (A-1) containing modified titanium oxide particles well dispersed therein. During the reaction of TKS-251 with bis(trimethylsiloxy)methylsilane, hydrogen gas was generated. The volume of the generated hydrogen gas was 718 ml as measured at 23° C. The obtained modified titanium oxide organosol was applied onto a KBr plate to thereby form a film on the plate. The film was taken as a sample and subjected to IR spectrometry. The IR spectrum obtained by the spectrometry showed that the absorption at 3,630 to 3,640 cm$^{-1}$ which is ascribed to a Ti—OH group disappeared.

Figure 1:
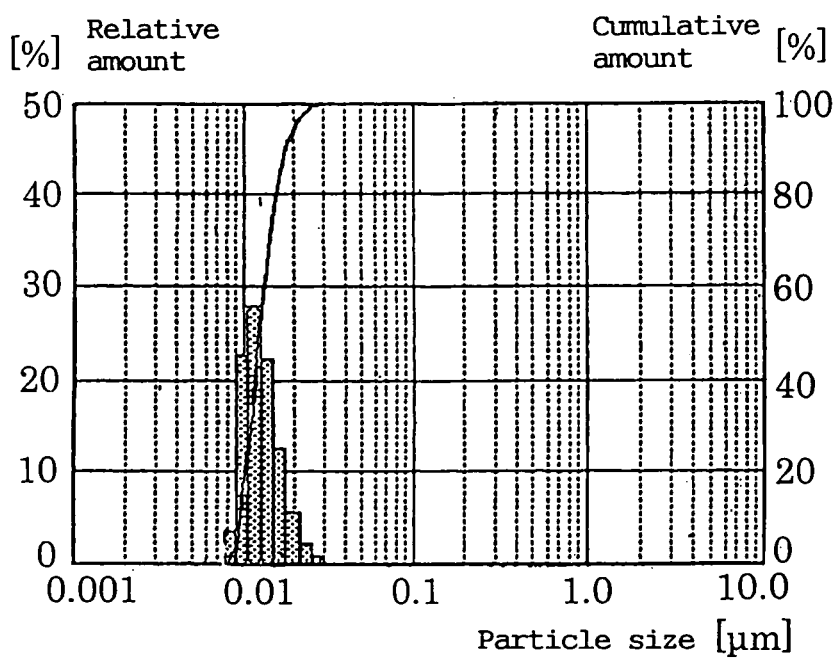
FIG. 1 shows the results of the measurement of the particle size distribution of TKS-251 (commercially available titanium oxide organosol) before subjected to a modification treatment, wherein the particle size distribution is measured by means of a wet-type particle size analyzer.
Figure 2:
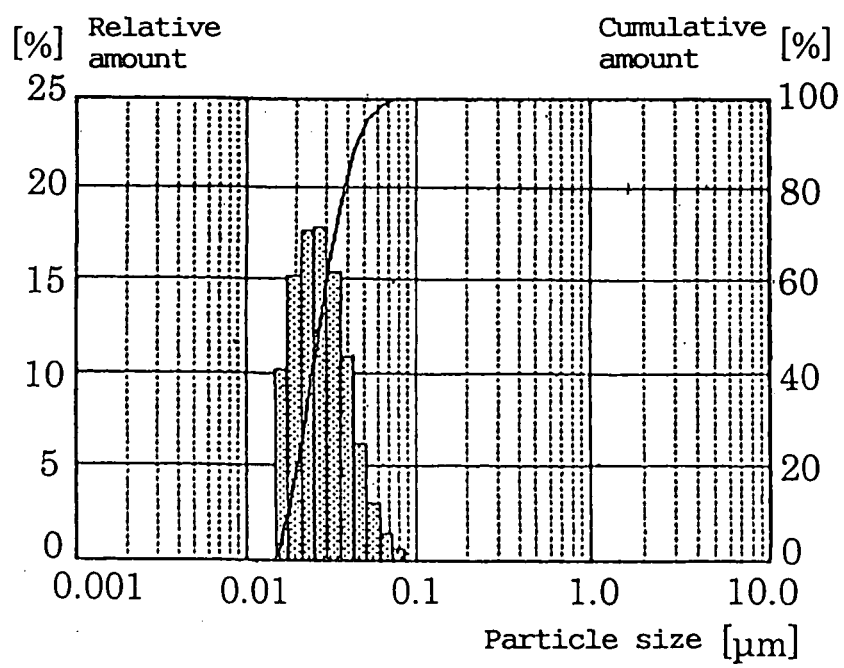
FIG. 2 shows the results of the measurement of the particle size distribution of modified photocatalyst organosol (A-1) which is obtained in Example 1 by subjecting the above-mentioned TKS-251 to a modification treatment, wherein the particle size distribution is measured by means of a wet-type particle size analyzer.

The particle size distribution of TKS-251 before subjected to the modification treatment and the particle size distribution of the above-obtained modified photocatalyst organosol (A-1) are shown in FIG. 1 and FIG. 2, respectively. It was found that modified photocatalyst organosol (A-1) had a monodispersive particle size distribution (number average particle diameter: 25 nm) and that the particle size distribution of modified photocatalyst organosol (A-1) no longer showed the peak found in the monodispersive particle size distribution (number average particle diameter: 12 nm) of TKS-251 before subjected to the modification treatment.

Next, 20 g of the above-mentioned modified photocatalyst organosol (A-1) was added to 68 g of the solution of binder component (B-1) which was produced in Reference Example 5, while stirring at room temperature. Subsequently, 0.5 g of a curing catalyst (dibutyltin dilaurate) was added to the resultant mixture while stirring, to thereby obtain photocatalyst composition (C-1).

An aluminum plate having a size of 50 mm×60 mm and a thickness of 1 mm (JIS, H, 4000 (A1050P)) was spray-coated with nax mightylac GII (color: white) (trade name of an acrylic urethane resin coating composition (two-pack coating composition)) (manufactured and sold by Nippon Paint Co., Ltd., Japan), followed by drying at room temperature for 3 days. Then, photocatalyst composition (C-1) obtained above was spray-coated onto the thus obtained acrylic urethane coating formed on the aluminum plate so that a coating of photocatalyst composition (C-1) having a thickness of 2 μm was formed and, then, the spray-coated photocatalyst composition (C-1) was dried at room temperature for 1 hour, followed by heating at 150° C. for 30 minutes, to thereby obtain test plate (D-1) having a photocatalyst-containing film.

Figure 3A:
FIG. 3(a) is a TEM photograph of the cross-section of test plate (D-1) having a photocatalyst-containing coating which is obtained in Example 1.
Figure 3B:
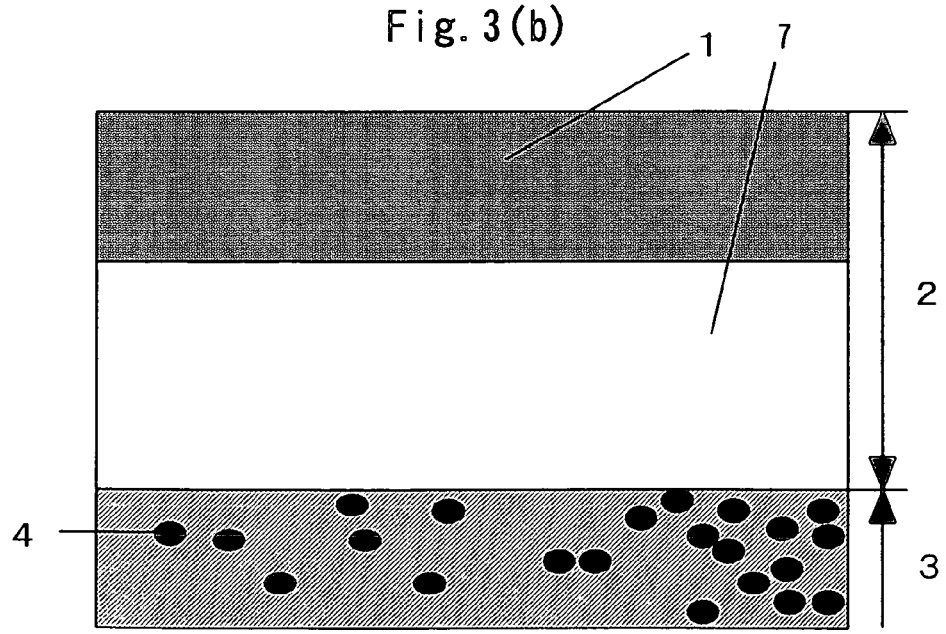
FIG. 3(b) is an illustration of FIG. 3(a)

A cross-section of the obtained test plate (D-1) having a photocatalyst-containing film was obtained and subjected to FIB (Focused Ion Beam) processing and the thus treated cross-section was observed through TEM. A TEM photograph of the cross-section of test plate (D-1) is shown in FIG. 3(a), and an illustration of FIG. 3(a) is shown in FIG. 3(b). From the observation, it was found that the modified photocatalyst particles were not present at the interface between the photocatalyst-containing film (indicated by reference numeral 2 in FIG. 3(b)) which contains the modified photocatalyst particles (indicated by reference numeral 1 in FIG. 3(b)), and the substrate which is the acrylic urethane coating (indicated by reference numeral 3 in FIG. 3(b)) containing a titanium oxide pigment (indicated by reference numeral 4 in FIG. 3(b)), and that the entire exposed surface of the photocatalyst-containing film 2 was covered with the modified photocatalyst particles 1.

The pencil hardness of test plate (D-1) having the photocatalyst-containing film was H, and the contact angle of water against the photocatalyst-containing film of test plate (D-1) was 1050. In addition, test plate (D-1) having the photocatalyst-containing film had satisfactory impact resistance.

Test plate (D-1) having the photocatalyst-containing film was irradiated with ultraviolet light (black light) and, then, the properties of the thus treated test plate (D-1) were evaluated. As a result, it was found that the pencil hardness of the photocatalyst-containing film had increased to more than 5H and the contact angle of water had decreased to 0°. In addition, the photocatalyst activity of the photocatalyst-containing film was evaluated and it was found that the photocatalyst activity was excellent (◯).

Further, an atmospheric exposure test was performed (for 1,000 hours) by a Dewpanel light control weather meter to determine the gloss retention value of test plate (D-1). The gloss retention value was 98% and, thus, test plate (D-1) had excellent weathering resistance.

EXAMPLE 2

Photocatalyst composition (C-1) obtained in Example 1 was spray-coated onto an epoxy resin (Quetol 812, manufactured and sold by NISSHIN EM Co., Ltd., Japan) to form a spray coating on the epoxy resin and, then, the epoxy resin having the spray coating was dried at room temperature for 2 days, followed by heating at 50° C. for 3 days, to thereby obtain epoxy resin test plate (D-2) having a smooth photocatalyst-containing film.

Figure 4A:
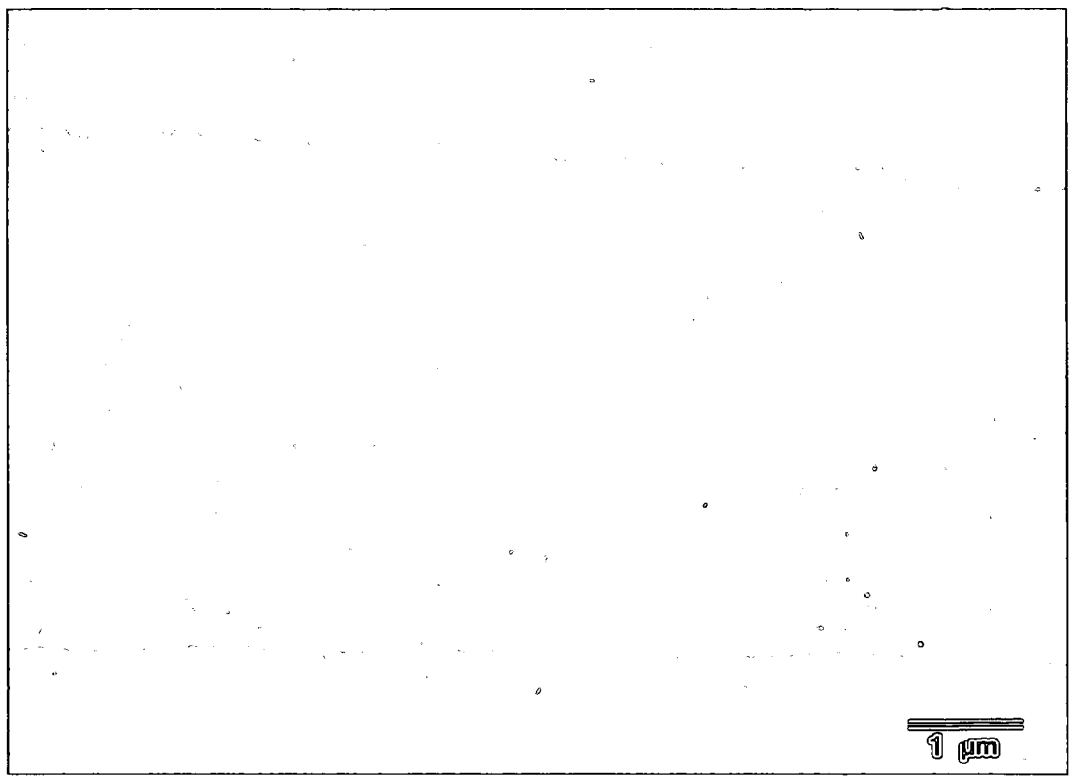
FIG. 4(a) is a TEM photograph of the cross-section of epoxy resin (D-2) having a photocatalyst-containing coating which is obtained in Example 2.

The obtained test plate (D-2) having a photocatalyst-containing film was embedded in an epoxy resin (Quetol 812), thereby obtaining an epoxy resin-embedded test plate (D-2). The obtained epoxy resin-embedded test plate (D-2) was cut by a microtome to prepare an ultrathin section (thickness: 50 to 60 nm) of test plate (D-2), and the obtained ultrathin section was subjected to $RuO_4$ staining of phenyl group-containing silicone (BP1-1) in the photocatalyst-containing film. Subsequently, the cross-section of test plate (D-2) having a photocatalyst-containing film was observed through TEM. A TEM photograph of the cross-section of test plate (D-2) is shown in FIG. 4(a), and an illustration of FIG. 4(a) is shown in FIG. 4(b).

Figure 4B:
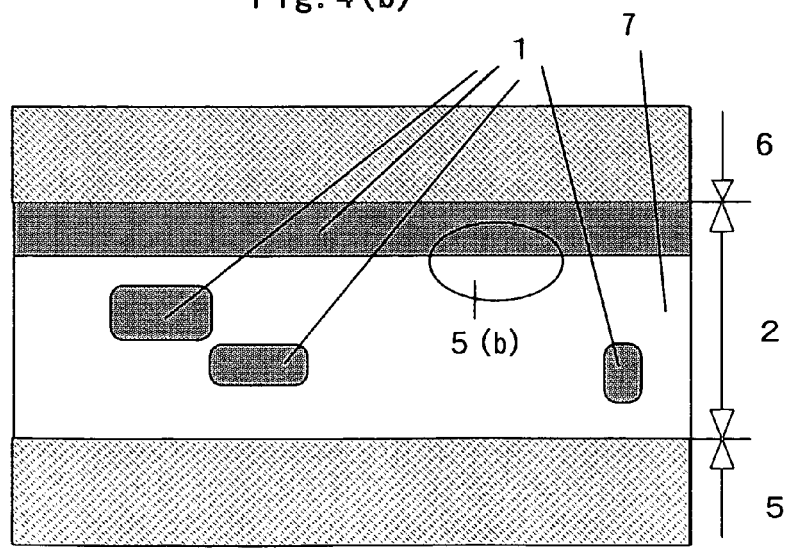
FIG. 4(b) is an illustration of FIG. 4(a)

From the observation, it was found that almost no modified photocatalyst particles were present at the interface between the photocatalyst-containing film (indicated by reference numeral 2 in FIG. 4(b)) which contains the modified photocatalyst particles (indicated by reference numeral 1 in FIG. 4(b)), and the epoxy resin substrate (indicated by reference numeral 5 in FIG. 4(b)), and that the entire exposed surface of the photocatalyst-containing film 2 was covered with the modified photocatalyst particles 1.

The portion indicated by reference numeral 5(b) in FIG. 4(b) is the interface between a phase comprising modified photocatalyst particles 1 (i.e., modified photocatalyst particle phase) and binder phase 7 containing no modified photocatalyst particles, and an enlarged photograph of this portion is shown in FIG. 5(a). An illustration of FIG. 5(a) is shown in FIG. 5(b).

FIG. 5(a) shows that the binder phase has both a portion containing the modified photocatalyst particles (indicated by reference numeral 1 in FIG. 5(b)) and a portion (indicated by reference numeral 7 in FIG. 5(b)) containing no modified photocatalyst particles. Further, it is also shown that the portion of the binder phase (indicated by reference numeral 7 in FIG. 5(b)), containing no modified photocatalyst particles, has a structure in which the phenyl group-containing silicone stained with $RuO_4$ and the unstained alkyl group-containing silicone exhibit a microphase separation.

COMPARATIVE EXAMPLE 1

A photocatalyst composition was produced in substantially the same manner as in Example 1 except that 10 g of unmodified TKS-251 was used instead of 20 g of modified photocatalyst organosol (A-1), thereby obtaining photocatalyst composition (C-2).

Using the produced photocatalyst composition (C-2), a test plate was produced in the same manner as in Example 1, thereby obtaining test plate (D-3) having a photocatalyst-containing film (having a titanium oxide content which is the same as in Example 1).

The pencil hardness of the obtained test plate (D-3) having the photocatalyst-containing film was H, and the contact angle of water was 97°.

Test plate (D-3) having the photocatalyst-containing film was irradiated with ultraviolet light (black light) and, then, the properties of the thus treated test plate (D-3) were evaluated. As a result, it was found that the pencil hardness of the photocatalyst-containing film had increased to 3H, but the contact angle of water was 94°. In addition, the photocatalyst activity of the photocatalyst-containing film was evaluated and it was found that the photocatalyst activity was poor (x).

Further, an atmospheric exposure test was performed for 200 hours by a Dewpanel light control weather meter to determine the gloss retention value of test plate (D-3). The gloss retention value was 10% or less and a chalking was observed.

COMPARATIVE EXAMPLE 2

Photocatalyst composition (C-2) obtained in Comparative Example 1 was spray-coated onto an epoxy resin (Quetol 812) to form a spray coating on the epoxy resin and, then, the epoxy resin having the spray coating was dried at room temperature for 2 days, followed by heating at 50° C. for 3 days, to thereby obtain epoxy resin test plate (D-4) having a smooth photocatalyst-containing film.

Figure 6A:
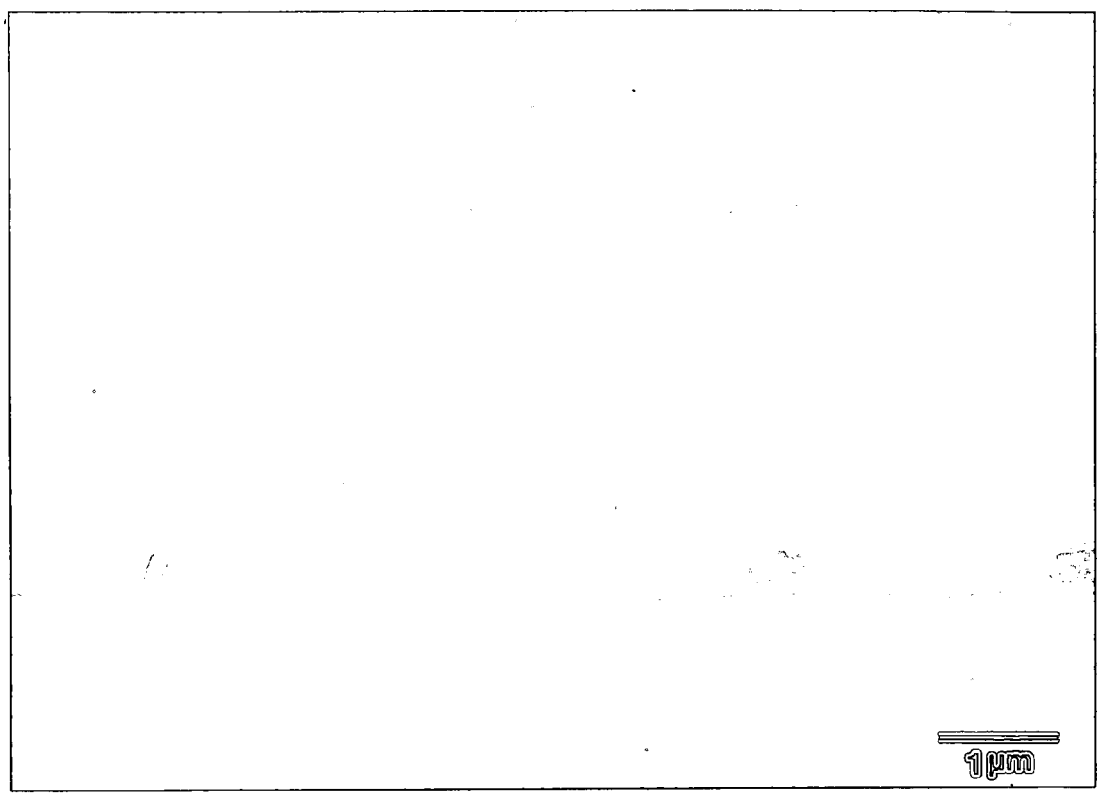
FIG. 6(a) is a TEM photograph of the cross-section of epoxy resin (D-3) having a photocatalyst-containing coating which is obtained in Comparative Example 1.

The obtained test plate (D-4) having a photocatalyst-containing film was embedded in an epoxy resin (Quetol 812), thereby obtaining an epoxy resin-embedded test plate (D-4). The obtained epoxy resin-embedded test plate (D-4) was cut by a microtome to prepare an ultrathin section (thickness: 50 to 60 nm) of test plate (D-4), and the obtained ultrathin section was subjected to $RuO_4$ staining of phenyl group-containing silicone (BP1-1) in the photocatalyst-containing film. Subsequently, the cross-section of test plate (D-4) having a photocatalyst-containing film was observed through TEM. A TEM photograph of the cross-section of test plate (D-4) is shown in FIG. 6(a), and an illustration of FIG. 6(a) is shown in FIG. 6(b).

Figure 6B:
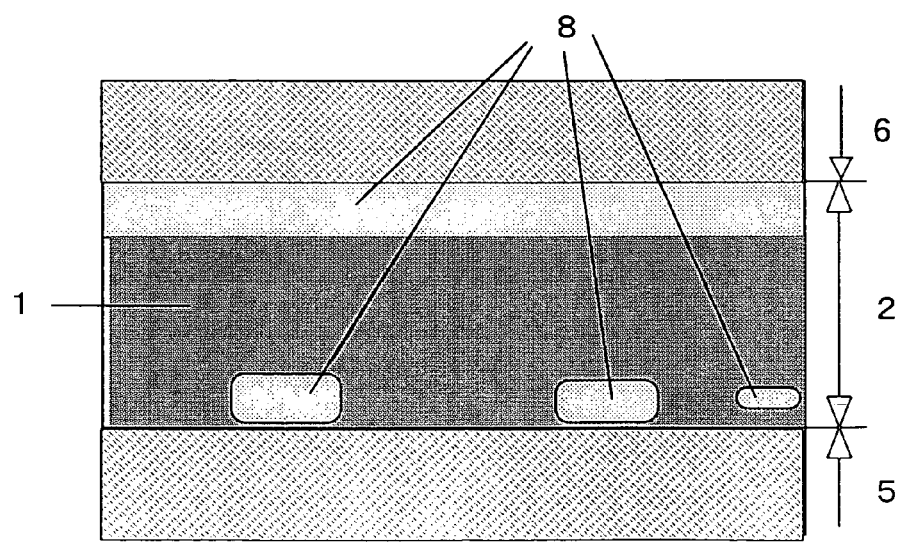
FIG. 6(b) is an illustration of FIG. 6(a).

From the observation, it was found that many modified photocatalyst particles (indicated by reference numeral 1 in FIG. 6(b)) were present at the interface between the photocatalyst-containing film (indicated by reference numeral 2 in FIG. 6(b)) which contains the modified photocatalyst particles, and the epoxy resin substrate (indicated by reference numeral 5 in FIG. 6(b)). It was also found that the entire exposed surface of the photocatalyst-containing film 2 was covered with the alkyl group-containing silicone (indicated by reference numeral 8 in FIG. 6(b)) containing no modified photocatalyst particles. Therefore, the photocatalyst-containing film could not be expected to exhibit the photocatalyst activity.

COMPARATIVE EXAMPLE 3

A photocatalyst composition was produced in substantially the same manner as in Example 1 except that 68 g of the solution of binder component (B-3) containing no phenyl group, which was produced in Reference Example 7, was used instead of binder component (B-1) produced in Reference Example 5, thereby obtaining photocatalyst composition (C-3).

Using the produced photocatalyst composition (C-3), a test plate was produced in the same manner as in Example 1, thereby obtaining test plate (D-5) having a photocatalyst-containing film (having a titanium oxide content which is the same as in Example 1).

The pencil hardness of test plate (D-5) having the photocatalyst-containing film was B, and the contact angle of water was 1050.

Test plate (D-5) having the photocatalyst-containing film was irradiated with ultraviolet light (black light) and, then, the properties of the thus treated test plate (D-5) were evaluated. As a result, it was found that the pencil hardness of the photocatalyst-containing film had increased to H, but the contact angle of water was 100°. In addition, the photocatalyst activity of the photocatalyst-containing film was evaluated and it was found that the photocatalyst activity was poor (x).

Further, an atmospheric exposure test was performed for 200 hours by a Dewpanel light control weather meter. As a result, the film peeled off from the substrate.

EXAMPLE 3

40 g of TKS-251 (trade name of a titanium oxide organosol; dispersion medium: mixed solvent of toluene and isopropanol, $TiO_2$ content: 20% by weight, average crystallite diameter: 6 nm which is a value described in the catalog) (manufactured and sold by Tayca Corporation, Japan) was charged into a reactor equipped with a reflux condenser, a thermometer and a stirrer. Subsequently, 8 g of 1,1,3,3-tetramethyldisiloxane was charged into the reactor over about 5 minutes at 40° C., and the resultant mixture in the reactor was stirred at 40° C. for 48 hours to thereby obtain modified photocatalyst organosol (A-2) containing modified titanium oxide particles well dispersed therein. During the reaction of TKS-251 with 1,1,3,3-tetramethyldisiloxane, hydrogen gas was generated. The volume of the generated hydrogen gas was 2,570 ml as measured at 23° C. The obtained modified photocatalyst organosol was applied onto a KBr plate to thereby form a film on the plate. The film was taken as a sample and subjected to IR spectrometry. The IR spectrum obtained by the spectrometry showed that the absorption at 3,630 to 3,640 $cm^{-1}$ which is ascribed to a Ti—OH group disappeared.

It was found that modified photocatalyst organosol (A-2) had a monodispersive particle size distribution (number average particle diameter: 22 nm) and that the particle size distribution of modified photocatalyst organosol (A-2) no longer showed the peak found in the monodispersive particle size distribution (number average particle diameter: 12 nm) of TKS-251 before subjected to the modification treatment.

Next, 12 g of the above-mentioned modified photocatalyst organosol (A-2) was added to 80 g of a 20% by weight toluene solution of the phenyl group-containing silicone (BP1-1) synthesized in Reference Example 1, while stirring at room temperature. Subsequently, 20 g of isopropanol and 22 g of butyl cellosolve were added the resultant mixture while stirring, followed by further addition of 0.5 g of a curing catalyst (dibutyltin dilaurate) while stirring, to thereby obtain photocatalyst composition (C-4).

Photocatalyst composition (C-4) obtained above was spray-coated onto a glass plate in a thickness of 2 µm and, then, the spray-coated photocatalyst composition (C-4) was dried at room temperature for 1 hour, followed by heating at 150° C. for 30 minutes, to thereby obtain glass test plate (D-6) having a transparent and smooth photocatalyst-containing film.

The pencil hardness of glass test plate (D-6) having the photocatalyst-containing film was H, and the contact angle of water was 930.

Glass test plate (D-6) having the photocatalyst-containing film was irradiated with ultraviolet light (black light) and, then, the properties of the thus treated glass test plate (D-6) were evaluated. As a result, it was found that the pencil hardness of the photocatalyst-containing film had increased to more than 5H and the contact angle of water had decreased to 0°. In addition, the photocatalyst activity of the photocatalyst-containing film was evaluated and it was found that the photocatalyst activity was excellent (⊙).

EXAMPLE 4

40 g of TKS-251 (trade name of a titanium oxide organosol; dispersion medium: mixed solvent of toluene and isopropanol, $TiO_2$ content: 20% by weight, average crystallite diameter: 6 nm which is a value described in the catalog) (manufactured and sold by Tayca Corporation, Japan) was charged into a reactor equipped with a reflux condenser, a thermometer and a stirrer. Subsequently, 8 g of KF9901 (trade name of a copolymer of methylhydrogensiloxane and dimethylsiloxane, Si—H group content: 7.14 mmol/g, weight average molecular weight: 3,900) (manufactured and sold by Shin-Etsu Chemical Co., Ltd., Japan) was charged into the reactor over about 5 minutes at 40° C., and the resultant mixture in the reactor was stirred at 40° C. for 48 hours to thereby obtain modified photocatalyst organosol (A-3). During the reaction of TKS-251 with KF9901, hydrogen gas was generated. The volume of the generated hydrogen gas was 980 ml as measured at 23° C.

The obtained modified photocatalyst organosol (A-3) was applied onto a KBr plate to thereby form a film on the plate. The film was taken as a sample and subjected to IR spectrometry. The IR spectrum obtained by the spectrometry showed that the absorption at 3,630 to 3,640 $cm^{-1}$ which is ascribed to a Ti—OH group disappeared.

It was found that modified photocatalyst organosol (A-3) had a monodispersive particle size distribution (number average particle diameter: 41 nm) and that the particle size distribution of modified photocatalyst organosol (A-3) no longer showed the peak found in the monodispersive particle size distribution (number average particle diameter: 12 nm) of TKS-251 before subjected to the modification treatment.

Next, 8.1 g of phenyl group-containing silicone (BP1-2) synthesized in Reference Example 4 was mixed with a crosslinking agent, namely 0.9 g of DMS-V00 (trade name of a vinyl-terminated polydimethylsiloxane) (manufactured and sold by Chisso Corporation, Japan) and, then, 14.7 g of toluene, 29.8 g of isopropanol and 15.1 g of butyl cellosolve were added to the resultant mixture, thereby obtaining a solution. Subsequently, to the obtained solution was added 12 g of the above-mentioned modified photocatalyst organosol (A-3) while stirring at room temperature, followed by addition of 0.4 g of a 0.25% dioxane solution of dichloro (dicyclopentadienyl)-platinum(II) while stirring at room temperature, to thereby obtain photocatalyst composition (C-5).

Photocatalyst composition (C-5) obtained above was spray-coated onto a steel plate in a thickness of 2 µm and, then, the spray-coated photocatalyst composition (C-5) was dried at room temperature for 1 hour, followed by heating at 140° C. for 30 minutes, to thereby obtain steel test plate (D-7) having a transparent and smooth photocatalyst-containing film.

The pencil hardness of steel test plate (D-7) having the photocatalyst-containing film was 2H, and the contact angle of water was 94°. In addition, the impact resistance of steel test plate (D-7) was satisfactory.

Steel test plate (D-7) having the photocatalyst-containing film was irradiated with ultraviolet light (black light) and, then, the contact angle of water against the photocatalyst-containing film was evaluated. As a result, it was found that the contact angle had decreased to 6°. In addition, the photocatalyst activity of the photocatalyst-containing film was evaluated and it was found that the photocatalyst activity was excellent (⊚).

EXAMPLE 5

A photocatalyst composition was produced in substantially the same manner as in Example 1 except that a solution of binder component (B-2) synthesized in Reference Example 6, which solution was obtained by dissolving 9 g of binder component (B-2) in a mixed solvent of 14.7 g of toluene, 29.8 g of isopropanol and 15.1 g of butyl cellosolve, was used instead of binder component (B-1) produced in Reference Example 5, thereby obtaining photocatalyst composition (C-6).

Using the produced photocatalyst composition (C-6), a test plate was produced in the same manner as in Example 1, thereby obtaining test plate (D-8) having a photocatalyst-containing film.

The pencil hardness of test plate (D-8) having the photocatalyst-containing film was 2H, and the contact angle of water was 99°.

Test plate (D-8) having the photocatalyst-containing film was irradiated with ultraviolet light (black light) and, then, the properties of the thus treated test plate (D-8) were evaluated. As a result, it was found that the pencil hardness of the photocatalyst-containing film had increased to 4H and the contact angle of water had decreased to 6°. In addition, the photocatalyst activity of the photocatalyst-containing film was evaluated and it was found that the photocatalyst activity was good (Δ).

Further, an atmospheric exposure test was performed (for 1,000 hours) by a Dewpanel light control weather meter. The gloss retention value was 60% and no chalking was observed.

COMPARATIVE EXAMPLE 4

A photocatalyst composition was produced in substantially the same manner as in Example 5 except that 10 g of unmodified TKS-251 was used instead of 20 g of modified photocatalyst organosol (A-1), thereby obtaining photocatalyst composition (C-7).

Using the produced photocatalyst composition (C-7), a test plate was produced in the same manner as in Example 5, thereby obtaining test plate (D-9) having a photocatalyst-containing film (having a titanium oxide content which is the same as in Example 5).

The pencil hardness of the obtained test plate (D-9) having the photocatalyst-containing film was 2H, and the contact angle of water was 920.

Test plate (D-9) having the photocatalyst-containing film was irradiated with ultraviolet light (black light) and, then, the properties of the thus treated test plate (D-9) were evaluated. As a result, it was found that the pencil hardness of the photocatalyst-containing film had increased to 3H and the contact angle of water had decreased to 82°. In addition, the photocatalyst activity of the photocatalyst-containing film was evaluated and it was found that the photocatalyst activity was poor (x).

Further, an atmospheric exposure test was performed for 200 hours by a Dewpanel light control weather meter to determine the gloss retention value of test plate (D-9). The gloss retention value was 10% or less and a chalking was observed.

EXAMPLE 6

40 g of TKS-251 (trade name of a titanium oxide organosol; dispersion medium: mixed solvent of toluene and isopropanol, TiO$_2$ content: 20% by weight, average crystallite diameter: 6 nm which is a value described in the catalog) (manufactured and sold by Tayca Corporation, Japan) was charged into a reactor equipped with a reflux condenser, a thermometer and a stirrer. Subsequently, 20 g of a 20% by weight toluene solution of 1,1,1,3,3,5,5-heptamethyltrisiloxane was charged into the reactor over about 5 minutes at 50° C., and the resultant mixture in the reactor was stirred at 50° C. for 12 hours to thereby obtain modified photocatalyst organosol (A-4) containing modified titanium oxide particles well dispersed therein. During the reaction of TKS-251 with 1,1,1,3,3,5,5-heptamethyltrisiloxane, hydrogen gas was generated. The volume of the generated hydrogen gas was 104 ml as measured at 23° C. The obtained modified titanium oxide organosol was applied onto a KBr plate to thereby form a film on the plate. The film was taken as a sample and subjected to IR spectrometry. The IR spectrum obtained by the spectrometry showed that the absorption at 3,630 to 3,640 cm$^{-1}$ which is ascribed to a Ti—OH group disappeared.

It was found that modified photocatalyst organosol (A-4) had a monodispersive particle size distribution (number average particle diameter: 18 nm) and that the particle size distribution of modified photocatalyst organosol (A-4) no longer showed the peak found in the monodispersive particle size distribution (number average particle diameter: 12 nm) of TKS-251 before subjected to the modification treatment.

Next, 20 g of the above-mentioned modified photocatalyst organosol (A-4) was added to 68 g of binder component (B-1) produced in Reference Example 5, while stirring at room temperature, followed by addition of 0.5 g of a curing catalyst (dibutyltin dilaurate) while stirring, to thereby obtain photocatalyst composition (C-8).

An acrylic urethane coating was formed on an aluminum plate in the same manner as in Example 1, and photocatalyst composition (C-8) obtained above was spray-coated onto the acrylic urethane coating in a thickness of 2 μm. Subsequently, the spray-coated photocatalyst composition (C-8) was dried at room temperature for 1 hour, followed by heating at 150° C. for 30 minutes, to thereby obtain test plate (D-10) having a photocatalyst-containing film.

The pencil hardness of test plate (D-10) having the photocatalyst-containing film was H, and the contact angle of water was 99°. In addition, test plate (D-10) had satisfactory impact resistance.

Test plate (D-10) having the photocatalyst-containing film was irradiated with ultraviolet light (black light) and, then, the properties of the thus treated test plate (D-10) were evaluated. As a result, it was found that the pencil hardness of the photocatalyst-containing film had increased to more than 5H and the contact angle of water had decreased to 4°. In addition, the photocatalyst activity of the photocatalyst-containing film was evaluated and it was found that the photocatalyst activity was excellent (⊚).

Further, an atmospheric exposure test was performed (for 1,000 hours) by a Dewpanel light control weather meter to determine the gloss retention value of test plate (D-10). The gloss retention value was 88% and, thus, test plate (D-10) had excellent weathering resistance.

EXAMPLE 7

40 g of TKS-251 (trade name of a titanium oxide organosol; dispersion medium: mixed solvent of toluene and isopropanol, $TiO_2$ content: 20% by weight, average crystallite diameter: 6 nm which is a value described in the catalog) (manufactured and sold by Tayca Corporation, Japan) was charged into a reactor equipped with a reflux condenser, a thermometer and a stirrer. Subsequently, 40 g of a 10% by weight toluene solution of tris(trimethylsiloxy)silane was charged into the reactor over about 5 minutes at 50° C., and the resultant mixture in the reactor was stirred at 50° C. for 12 hours to thereby obtain modified photocatalyst organosol (A-5) containing modified titanium oxide particles well dispersed therein. During the reaction of TKS-251 with tris(trimethylsiloxy)silane, hydrogen gas was generated. The volume of the generated hydrogen gas was 230 ml as measured at 23° C. The obtained modified titanium oxide organosol was applied onto a KBr plate to thereby form a film on the plate. The film was taken as a sample and subjected to IR spectrometry. The IR spectrum obtained by the spectrometry showed that the absorption at 3,630 to 3,640 $cm^{-1}$ which is ascribed to a Ti—OH group disappeared.

It was found that modified photocatalyst organosol (A-5) had a monodispersive particle size distribution (number average particle diameter: 32 nm) and that the particle size distribution of modified photocatalyst organosol (A-5) no longer showed the peak found in the monodispersive particle size distribution (number average particle diameter: 12 nm) of TKS-251 before subjected to the modification treatment.

Next, 20 g of the above-mentioned modified photocatalyst organosol (A-5) was added to 68 g of the solution of binder component (B-1) which was produced in Reference Example 5, while stirring at room temperature, followed by addition of 0.5 g of a curing catalyst (dibutyltin dilaurate) while stirring, to thereby obtain photocatalyst composition (C-9).

An acrylic urethane coating was formed on an aluminum plate in the same manner as in Example 1 and photocatalyst composition (C-9) obtained above was spray-coated onto the acrylic urethane coating in a thickness of 2 μm. Subsequently, the spray-coated photocatalyst composition (C-9) was dried at room temperature for 1 hour, followed by heating at 150° C. for 30 minutes, to thereby obtain test plate (D-11) having a photocatalyst-containing film.

The pencil hardness of test plate (D-11) having the photocatalyst-containing film was HB, and the contact angle of water was 108°. In addition, test plate (D-11) had satisfactory impact resistance.

Test plate (D-11) having the photocatalyst-containing film was irradiated with ultraviolet light (black light) and, then, the properties of the thus treated test plate (D-11) were evaluated. As a result, it was found that the pencil hardness of the photocatalyst-containing film had increased to 4H and the contact angle of water had decreased to 0°. In addition, the photocatalyst activity of the photocatalyst-containing film was evaluated and it was found that the photocatalyst activity was excellent (⊚).

Further, an atmospheric exposure test was performed (for 1,000 hours) by a Dewpanel light control weather meter to determine the gloss retention value of test plate (D-11). The gloss retention value was 94% and, thus, test plate (D-11) had excellent weathering resistance.

COMPARATIVE EXAMPLE 5

56 g of TKS-203 (trade name of a titanium oxide hydrosol; dispersion medium: water, $TiO_2$ content: 20% by weight, average crystallite diameter: 6 nm which is a value described in the catalog) (manufactured and sold by Tayca Corporation, Japan) was diluted with 44 g of ion-exchanged water. The resultant diluted TKS-203 was mixed with 10 g of X-41-7001 (trade name of a silicone acrylic emulsion, solids content of silicone acrylic resin: 42% by weight, pH value: 7, silicone resin content of the solids contained in the emulsion: 50% by weight) (manufactured and sold by Shin-Etsu Chemical Co., Ltd., Japan) and 12 g of CAT-AS (trade name of a basic curing catalyst) (manufactured and sold by Shin-Etsu Chemical Co., Ltd., Japan). The resultant mixture was charged into a paint shaker and stirred for 10 minutes, to thereby obtain photocatalyst composition (C-10).

An acrylic urethane coating was formed on an aluminum plate in the same manner as in Example 1, and photocatalyst composition (C-10) obtained above was spray-coated onto the acrylic urethane coating in a thickness of 4 μm. Subsequently, the spray-coated photocatalyst composition (C-10) was dried at room temperature for 1 hour, followed by further drying at room temperature for 1 week, to thereby obtain test plate (D-12) having a photocatalyst-containing film.

The pencil hardness of test plate (D-12) having the photocatalyst-containing film was 3B, and the contact angle of water was 92°.

Test plate (D-12) having the photocatalyst-containing film was irradiated with ultraviolet light (black light) and, then, the properties of the thus treated test plate (D-12) were evaluated. As a result, it was found that the pencil hardness of the photocatalyst-containing film had increased to 2B and the contact angle of water had decreased to 10°.

Further, an atmospheric exposure test was performed for 200 hours by a Dewpanel light control weather meter to determine the gloss retention value of test plate (D-12). The gloss retention value was 10% or less and a chalking was observed.

INDUSTRIAL APPLICABILITY

When the photocatalyst composition of the present invention is used to form a film on the surface of an organic substrate, there can be obtained, without a cumbersome operation, a functional composite which is advantageous in that it is free from deterioration occurring at the interface between the substrate and the photocatalyst-containing film and free from deterioration of the binder component in the photocatalyst-containing film, and in that it exhibits an excellent balance of hardness and flexibility (impact resistance), and it has excellent durability such that the surface of the functional composite exhibits, by light irradiation, a water contact characteristic (i.e., hydrophilicity or hydrophobicity) and/or maintains such photocatalyst activity for a long time.

The invention claimed is:

1. A photocatalyst composition comprising:
   (A) modified photocatalyst particles,
   said modified photocatalyst particles (A) being prepared by subjecting particles of a photocatalyst (a) to a modification treatment with at least one modifier compound (b) selected from the group consisting of different compounds each of which independently comprises at least one structural unit selected from the group consisting of a triorganosilane unit represented by formula (1), a monooxydiorganosilane unit represented by formula (2), and a dioxyorganosilane unit represented by formula (3):

$$R_3Si— \quad (1)$$

wherein each R independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group or a $C_1$–$C_{20}$ alkoxy group, $$—(R_2SiO)— \quad (2)$$

wherein each R is as defined for formula (1), and

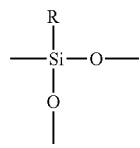

(3)

wherein R is as defined for formula (1), and
(B) a binder component which comprises a phenyl group-containing silicone (BP), optionally containing an alkyl group, represented by formula (4):

$$R^1_p R^2_q X_r SiO_{(4-p-r)/2} \quad (4)$$

wherein:
the or each $R^1$ represents a phenyl group, and the or each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group;
the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and
p, q and r satisfy the following relationships:
$0<p<4$,
$0\leq q<4$,
$0\leq r<4$,
$0<(p+q+r)<4$, and
$0.05\leq p/(p+q)\leq 1$.

2. The composition according to claim 1, wherein said phenyl group-containing silicone (BP) is a phenyl group-containing silicone (BP1), containing no alkyl group, represented by formula (5):

$$R^1_s X_t SiO_{(4-s-t)/2} \quad (5)$$

wherein:
the or each $R^1$ represents a phenyl group;
the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and
s and t satisfy the following relationships:
$0<s<4$,
$0\leq t<4$, and
$0<(s+t)<4$.

3. The composition according to claim 1 or 3, wherein said binder component (B) further comprises an alkyl group-containing silicone (BA) represented by formula (6):

$$R^2_u X_v SiO_{(4-u-v)/2} \quad (6)$$

wherein:
the or each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group;
the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and
u and v satisfy the following relationships:
$0<u<4$,
$0\leq v<4$, and
$0<(u+v)<4$.

4. The composition according to claim 1 or 2, wherein said binder component (B) comprises a phenyl group-containing silicone (BP1), containing no alkyl group, represented by formula (5):

$$R^1_s X_t SiO_{(4-s-t)/2} \quad (5)$$

wherein:
the or each $R^1$ represents a phenyl group;
the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and
s and t satisfy the following relationships:
$0<s<4$,
$0\leq t<4$, and
$0<(s+t)<4$; and
an alkyl group-containing silicone (BA) represented by formula (6):

$$R^2_u X_v SiO_{(4-u-v)/2} \quad (6)$$

wherein:
the or each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group;
the or each X independently represents a hydrogen atom, a hydroxyl group, a $C_1$–$C_{20}$ alkoxy group, a $C_1$–$C_{20}$ acyloxy group, an aminoxy group, a $C_1$–$C_{20}$ oxime group or a halogen atom; and
u and v satisfy the following relationships:
$0<u<4$,
$0\leq v<4$, and
$0<(u+v)<4$.

5. The composition according to claim 3, wherein said alkyl group-containing silicone (BA) comprises a monooxydiorganosilane unit (D) represented by formula (7) and a dioxyorganosilane unit (T) represented by formula (8):

$$—(R^2_2SiO)— \quad (7)$$

wherein each $R^2$ independently represents a straight chain or branched $C_1$–$C_{30}$ alkyl group, a $C_5$–$C_{20}$ cycloalkyl group or a straight chain or branched $C_2$–$C_{30}$ alkenyl group, and

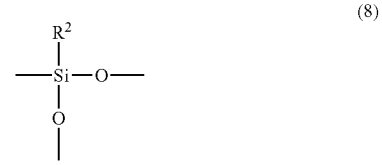

(8)

wherein $R^2$ is as defined for formula (7).

6. The composition according to claim 2, wherein said phenyl group-containing silicone (BP1) has a weight average molecular weight of from 500 to 10,000, as measured by gel permeation chromatography using a calibration curve obtained with respect to standard polystyrenes.

7. The composition according to claim 3, wherein said alkyl group-containing silicone (BA) has a weight average molecular weight of from 500 to 10,000, as measured by gel permeation chromatography using a calibration curve obtained with respect to standard polystyrenes.

8. The composition according to claim 1 or 2, wherein said modified photocatalyst particles (A) have a number average particle diameter of 400 nm or less.

9. The composition according to claim 1 or 2, wherein said photocatalyst particles (a) are titanium oxide particles.

10. The composition according to claim 1 or 2, wherein said modifier compound (b) is an Si—H group-containing silicon compound (b1) represented by formula (9):

$$H_xR_ySiO_{(4-x-y)/2} \quad (9)$$

wherein:
the or each R independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group, a phenyl group, a $C_1$–$C_{20}$ alkoxy group or a hydroxy group, and x and y satisfy the following relationships:
$0<x<4$,
$0<y<4$, and
$(x+y) \leq 4$.

11. The composition according to claim 10, wherein said Si—H group-containing silicon compound (b1) comprises at least one compound selected from the group consisting of:
a mono Si—H group-containing silicon compound represented by formula (10):

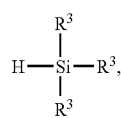

(10)

wherein each $R^3$ independently represents a chain or branched $C_1$–$C_{30}$ alkyl group, a straight chain or branched $C_2$–$C_{30}$ alkenyl group, a $C_5$–$C_{20}$ cycloalkyl group, a straight chain or branched $C_1$–$C_{30}$ fluoroalkyl group, a phenyl group or a siloxy group represented by formula (13):

$$—O—(R^4{}_2SiO)_m—SiR^4{}_3 \quad (13)$$

wherein each $R^4$ independently represents a straight chain or branched $C_1$–$C_{30}$ alkyl group, a $C_5$–$C_{20}$ cycloalkyl group, a straight chain or branched $C_1$–$C_{30}$ fluoroalkyl group, a straight chain or branched $C_2$–$C_{30}$ alkenyl group or a phenyl group; and m is an integer which satisfies the formula: $0<m<1000$, a silicon compound, having Si—H groups at both terminals thereof, represented by formula (11):

$$H—(R^3{}_2SiO)_n—SiR^3{}_2—H \quad (11)$$

wherein $R^3$ is as defined for formula (10); and
n is an integer which satisfies the formula: $0 \leq n \leq 1000$, and an H silicone represented by formula (12):

$$(R^3HSiO)_a(R^3{}_2SiO)_b(R^3{}_3SiO_{1/2})_c \quad (12)$$

wherein:
$R^3$ is as defined for formula (10); and
a is an integer of 1 or more, b is an integer of 0 or more, and a and b satisfy the following relationship: $(a+b) \leq 10000$, and c is 0 or 2, and wherein when (a+b) is an integer of 2 or more and c=0, said H silicone of formula (12) is a cyclic silicone, and when c=2, said H silicone of formula (12) is a straight chain silicone.

12. The composition according to claim 1 or 2, which further comprises a resin.

13. The composition according to claim 1 or 2, which is a film.

14. The composition according to claim 13, which is anisotropic with respect to the distribution of the modified photocatalyst particles (A), wherein the concentration of the modified photocatalyst particles (A) increases from one surface of the film toward the other surface of the film.

15. The composition according to claim 1 or 2, which is a shaped article.

16. The composition according to claim 15, which is anisotropic with respect to the distribution of the modified photocatalyst particles (A), wherein the concentration of the modified photocatalyst particles (A) increases from the inner portion of the shaped article toward the surface of the shaped article.

17. The composition according to claim 3, which is a film which has a microphase separation structure with respect to said phenyl group-containing silicone (BP) and said alkyl group-containing silicone (BA).

18. The composition according to claim 17, which is anisotropic with respect to the distribution of the modified photocatalyst particles (A), wherein the concentration of the modified photocatalyst particles (A) increases from one surface of the film toward the other surface of the film.

19. The composition according to claim 3, which is a shaped article which has a microphase separation structure with respect to said phenyl group-containing silicone (BP) and said alkyl group-containing silicone (BA).

20. The composition according to claim 19, which is anisotropic with respect to the distribution of the modified photocatalyst particles (A), wherein the concentration of the modified photocatalyst particles (A) increases from the inner portion of the shaped article toward the surface of the shaped article.

21. A functional composite comprising a substrate and a film formed on said substrate, said film comprising the composition of claim 1 or 2.

22. The functional composite according to claim 21, wherein said film is anisotropic with respect to the distribution of the modified photocatalyst particles (A), wherein the concentration of the modified photocatalyst particles (A) increases from a surface of the film which contacts the substrate toward the other, exposed surface of the film.

23. A functional composite comprising a substrate and a film formed on said substrate, said film comprising the composition of claim 3 and having a microphase separation structure with respect to said phenyl group-containing silicone (BP) and said alkyl group-containing silicone (BA).

24. The functional composite according to claim 23, wherein said film is anisotropic with respect to the distribution of the modified photocatalyst particles (A), wherein the concentration of the modified photocatalyst particles (A)

increases from a surface of the film which contacts the substrate toward the other, exposed surface of the film.

25. The composition according to claim 1, wherein the or each R of each of formulae (1) to (3) independently represents a straight chain or branched $C_1$–$C_{30}$ alkyl group, a $C_5$–$C_{20}$ cycloalkyl group, a straight chain or branched $C_1$–$C_{30}$ fluoroalkyl group or a straight chain or branched $C_2$–$C_{30}$ alkenyl group.

26. The composition according to claim 1, wherein said modified photocatalyst particles (A) comprise said particles of a photocatalyst (a) and, immobilized thereon, said at least one modifier compound (b).

* * * * *

UNITED STATES PATENT AND TRADEMARK OFFICE
CERTIFICATE OF CORRECTION

PATENT NO. : 7,211,543 B2
APPLICATION NO. : 10/516348
DATED : May 1, 2007
INVENTOR(S) : Nakabayashi et al.

It is certified that error appears in the above-identified patent and that said Letters Patent is hereby corrected as shown below:

Column 51, Line 28, change "$R^1_p R^2_q X_r SiO_{(4-p-r)/2}$" to --$R^1_p R^2_q X_r SiO_{(4-p-q-r)/2}$--.

Column 51, Line 64, change "3," to --2,--.

Signed and Sealed this

Twenty-seventh Day of April, 2010

David J. Kappos
*Director of the United States Patent and Trademark Office*